United States Patent
Kim et al.

(10) Patent No.: US 10,234,708 B2
(45) Date of Patent: Mar. 19, 2019

(54) DISPLAY DEVICE

(71) Applicant: LG ELECTRONICS INC., Seoul (KR)

(72) Inventors: Hyunho Kim, Seoul (KR); Seunggyu Kang, Seoul (KR); Jein Lee, Seoul (KR); Injung Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/575,189

(22) PCT Filed: Feb. 25, 2016

(86) PCT No.: PCT/KR2016/001845
§ 371 (c)(1),
(2) Date: Nov. 17, 2017

(87) PCT Pub. No.: WO2016/186297
PCT Pub. Date: Nov. 24, 2016

(65) Prior Publication Data
US 2018/0149903 A1    May 31, 2018

(30) Foreign Application Priority Data
May 19, 2015 (KR) .......................... 10-2015-0069862

(51) Int. Cl.
*G02F 1/13*      (2006.01)
*G02F 1/1333*    (2006.01)

(52) U.S. Cl.
CPC ...... *G02F 1/133308* (2013.01); *G02F 1/1333* (2013.01); *G02F 2001/133314* (2013.01); *G02F 2001/133322* (2013.01)

(58) Field of Classification Search
None
See application file for complete search history.

(56) References Cited

U.S. PATENT DOCUMENTS

| | | | |
|---|---|---|---|
| 6,593,979 B1* | 7/2003 | Ha | G02F 1/133308 349/187 |
| 6,989,986 B2* | 1/2006 | Kumagai | G06F 1/1616 248/917 |
| 7,576,811 B2* | 8/2009 | Kazushige | G02B 6/0088 349/61 |
| 7,679,694 B2* | 3/2010 | Shirai | G02F 1/133308 349/58 |

(Continued)

FOREIGN PATENT DOCUMENTS

| KR | 10-2012-0044735 A | 5/2012 |
|---|---|---|
| KR | 10-2013-0049574 A | 5/2013 |

(Continued)

*Primary Examiner* — Xanthia C Cunningham
(74) *Attorney, Agent, or Firm* — Birch, Stewart, Kolasch & Birch, LLP

(57) ABSTRACT

A display device including a display panel; an optical sheet positioned at a rear of the display panel; a guide panel positioned at a lateral side of at least one of the display panel and the optical sheet; and a back cover positioned at a rear of the guide panel. The guide panel includes a guide latch assembly facing the back cover, and the back cover includes a back cover latch assembly coupled to the guide latch assembly to couple the back cover to the guide panel.

19 Claims, 26 Drawing Sheets

(56) References Cited

U.S. PATENT DOCUMENTS

| | | | |
|---|---|---|---|
| 8,896,781 B2* | 11/2014 | Tanaka | G02F 1/133308 348/787 |
| 2005/0213924 A1* | 9/2005 | Sakurai | G02F 1/133308 385/147 |
| 2007/0285878 A1 | 12/2007 | Konno et al. | |
| 2008/0278895 A1* | 11/2008 | Woo | G02F 1/133308 361/679.02 |
| 2008/0278896 A1* | 11/2008 | Kawano | G02F 1/133308 361/679.02 |
| 2009/0079902 A1* | 3/2009 | Ogura | G02F 1/133308 349/58 |
| 2009/0225254 A1* | 9/2009 | Matsuzawa | G02F 1/133308 349/58 |
| 2010/0066217 A1 | 3/2010 | Fujikawa et al. | |
| 2010/0188597 A1* | 7/2010 | Koike | G02F 1/133308 349/58 |
| 2010/0188607 A1* | 7/2010 | Park | G02B 6/0073 349/62 |
| 2012/0026658 A1* | 2/2012 | Yoshimatsu | H04N 5/64 361/679.01 |
| 2012/0069262 A1* | 3/2012 | Kang | G02F 1/133608 349/58 |
| 2012/0249917 A1 | 10/2012 | Tanaka | |
| 2013/0010415 A1* | 1/2013 | Hatta | G02F 1/133308 361/679.01 |
| 2013/0114003 A1* | 5/2013 | Tanaka | G02F 1/133308 348/836 |
| 2013/0155717 A1* | 6/2013 | Jeong | G02F 1/133308 362/602 |
| 2013/0155721 A1* | 6/2013 | Miyazaki | G02F 1/133615 362/611 |
| 2013/0235277 A1* | 9/2013 | Suwa | H04N 5/64 348/725 |
| 2013/0308074 A1* | 11/2013 | Park | G02B 6/0088 349/58 |
| 2014/0176852 A1* | 6/2014 | Ha | G02F 1/133308 349/58 |
| 2014/0176869 A1* | 6/2014 | Lee | G02F 1/133615 349/65 |
| 2014/0192554 A1* | 7/2014 | Tomomasa | G02B 6/0088 362/606 |
| 2014/0198474 A1* | 7/2014 | Byeon | G02F 1/133308 361/809 |
| 2014/0204275 A1* | 7/2014 | Shimizu | G02F 1/133611 348/725 |
| 2014/0285978 A1* | 9/2014 | Suzuki | H05K 7/14 361/747 |
| 2015/0201763 A1* | 7/2015 | Choi | G09F 13/0413 40/716 |
| 2015/0373857 A1* | 12/2015 | Chikazawa | H04N 5/64 348/726 |
| 2016/0073536 A1* | 3/2016 | Zhao | G02B 6/0088 362/606 |
| 2016/0187573 A1* | 6/2016 | Kim | G02B 6/0088 362/606 |
| 2017/0343841 A1* | 11/2017 | Cho | G02F 1/133308 |
| 2018/0126501 A1* | 5/2018 | Choi | G02F 1/133608 |

FOREIGN PATENT DOCUMENTS

| | | |
|---|---|---|
| KR | 10-2013-0106119 A | 9/2013 |
| KR | 10-2014-0025616 A | 3/2014 |
| WO | WO 2010/107198 A1 | 9/2010 |

* cited by examiner (a)

(b)

(a)

(b)

DISPLAY DEVICE

CROSS-REFERENCE TO RELATED APPLICATIONS

This application is the National Phase of PCT International Application No. PCT/KR2016/001845, filed on Feb. 25, 2016, which claims priority under 35 U.S.C. § 119(a) to Patent Application No. 10-2015-0069862, filed in the Republic of Korea on May 19, 2015, all of which are hereby expressly incorporated by reference into the present application.

BACKGROUND OF THE INVENTION

Field of the Invention

The present invention relates to a display device capable of easily coupling a back cover.

Discussion of the Related Art

As the information society develops, the demand for display devices is increasing in various forms. In recent years, various display devices such as a liquid crystal display device (LCD), a plasma display panel (PDP), an electro luminescent display (ELD), and a vacuum fluorescent display (VFD) have been studied and used.

There is a necessity for a method that can easily assemble components of the display device.

SUMMARY OF THE INVENTION

Accordingly, an object of the present disclosure is to address the above-described and other problems.

The present invention is to solve the above problems. Another object of the present invention is to easily combine the back cover.

According to an aspect of the present invention, there is provided a display device, comprising: a display panel; an optical sheet positioned at a rear of the display panel; a guide panel positioned at a lateral side of at least one of the display panel and the optical sheet; and a back cover coupled to the guide panel and positioned at a rear of the guide panel, wherein a plurality of latch assemblies is formed at a position of the guide panel and another position of the back cover, the other position corresponding to the position of the guide, and wherein each of the plurality of latch assemblies includes: a first rib restricting a horizontal movement of the back cover; and a second rib restricting a vertical movement of the back cover.

According to another aspect of the present invention, each of the plurality of latch assemblies may include a third rib restricting a front-back movement of the back cover.

According to another aspect of the present invention, the third rib may include: a hooking protrude located at the guide panel; and a coupling rib located at the back cover, the coupling rib coupled to the hooking protrude.

According to another aspect of the present invention, the first to third ribs may be disposed at an upper long edge region of the display device and at both short edge regions of the display device.

According to another aspect of the present invention, each of the plurality of latch assemblies may include at least one coupling region formed by the first and second ribs.

According to another aspect of the present invention, at least one of the first and second ribs may be inserted into the coupling region.

According to another aspect of the present invention, an area of the coupling region may be a direction of at least one of the first and second ribs, and another area of the coupling region may be another direction of at least one of the first and second ribs.

According to another aspect of the present invention, the plurality of latch assemblies may include: a guide latch assembly provided at the guide panel; and a back cover latch assembly provided at the back cover, the back cover latch assembly corresponding to the guide latch assembly, the guide latch assembly may include: a first guide latch assembly disposed alongside of a long edge of the guide panel; and a second guide latch assembly disposed along side of a short edge of the guide panel.

According to another aspect of the present invention, the first guide latch assembly may be provided in plural, and a size of the coupling region formed at at least one first guide latch assembly of the plurality of first guide latch assemblies may be different from a size of the coupling region formed at at least another first guide latch assembly of the plurality of first guide latch assemblies.

According to another aspect of the present invention, the at least one first guide latch assembly may be positioned at a central region of the long edge of the guide panel, and the at least the other first guide latch assembly may be positioned at an outer region of the long edge of the guide panel.

According to another aspect of the present invention, the size of the coupling region at the central region of the long edge of the guide panel may be smaller than a size of the coupling region at the outer region of the long edge of the guide panel.

According to at least one of the embodiments of the present invention, the back cover can be easily combined.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
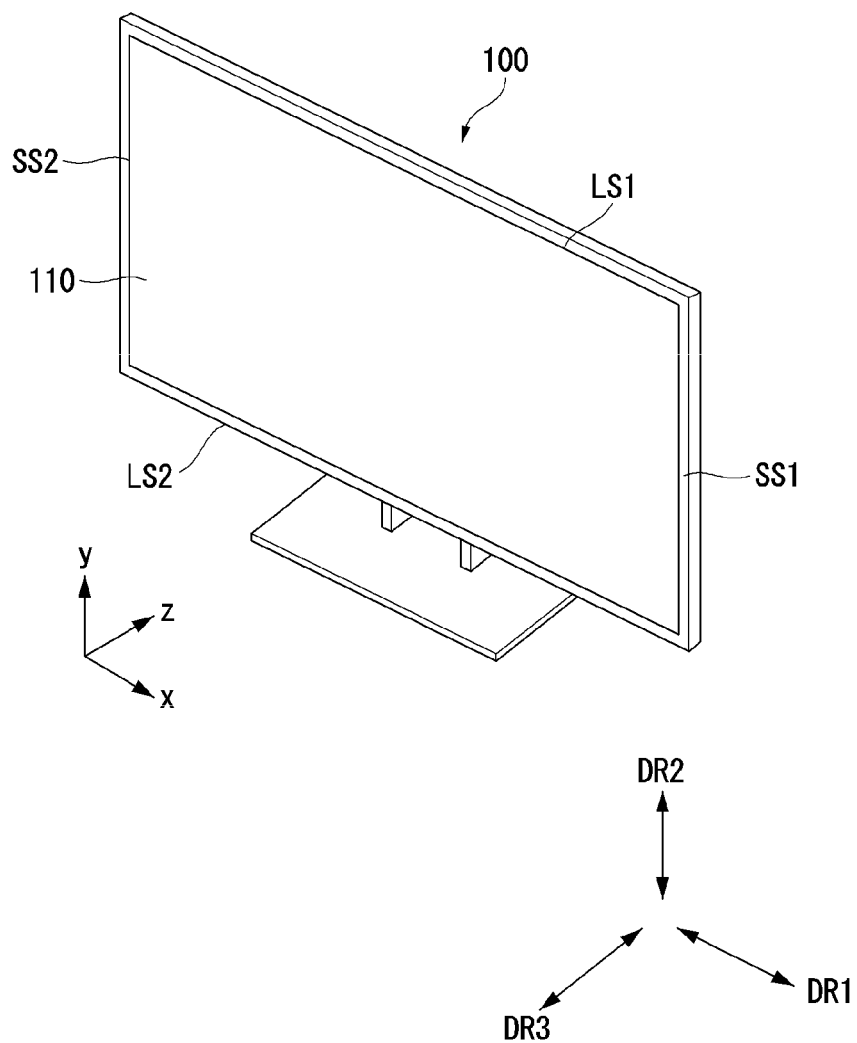
FIGS. 1 and 2 are views showing the display device according to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, a liquid crystal display device (LCD) will be described as an example of the display panel, but the display panel applicable to the present invention may not be limited to the liquid crystal panel.

The display device 100 may include a first long side LS1 and a second long side LS2 opposite to the first long side LS1. The display device 100 may include a first short side SS1 and a second short side SS2 opposite to the first short side SS1. The first short side SS1 may be adjacent to both the first long side LS1 and the second long side LS2.

An area adjacent to the first short side SS1 may be referred to as a first short side area SS1. An area adjacent to the second short side SS2 may be referred to as a second short side area SS2. An area adjacent to the first long side LS1 may be referred to as a first long side area LS1. An area adjacent to the second long side LS2 may be referred to as a second long side area LS2. The first short side area SS1 may be referred to as a first side area. The second short side area SS2 may be referred to as a second side area. The first long side area LS1 may be referred to as a third side area. The second long side area LS2 may be referred to as a fourth side area.

The lengths of the first and second long sides LS1 and LS2 may be longer than the lengths of the first and second short sides SS1 and SS2 for the convenience of explanation. It is also possible that the lengths of the first and second long sides LS1 and LS2 are substantially equal to the lengths of the first and second short sides SS1 and SS2.

The display device 100 may include a display panel 110 for displaying an image. The display panel 110 may form a front surface of the display device 100. The display panel 110 can display an image toward the front of the display device 100. The first direction DR1 may be a direction along to the long sides LS1 and LS2 of the display device 100. The second direction DR2 may be a direction along to the short sides SS1 and SS2 of the display device 100.

The third direction DR3 may be a direction normal to the first direction DR1 and/or the second direction DR2.

The first direction DR1 and the second direction DR2 may collectively be referred to as a horizontal direction.

In addition, the third direction DR3 may be referred to as a vertical direction.

Figure 2:
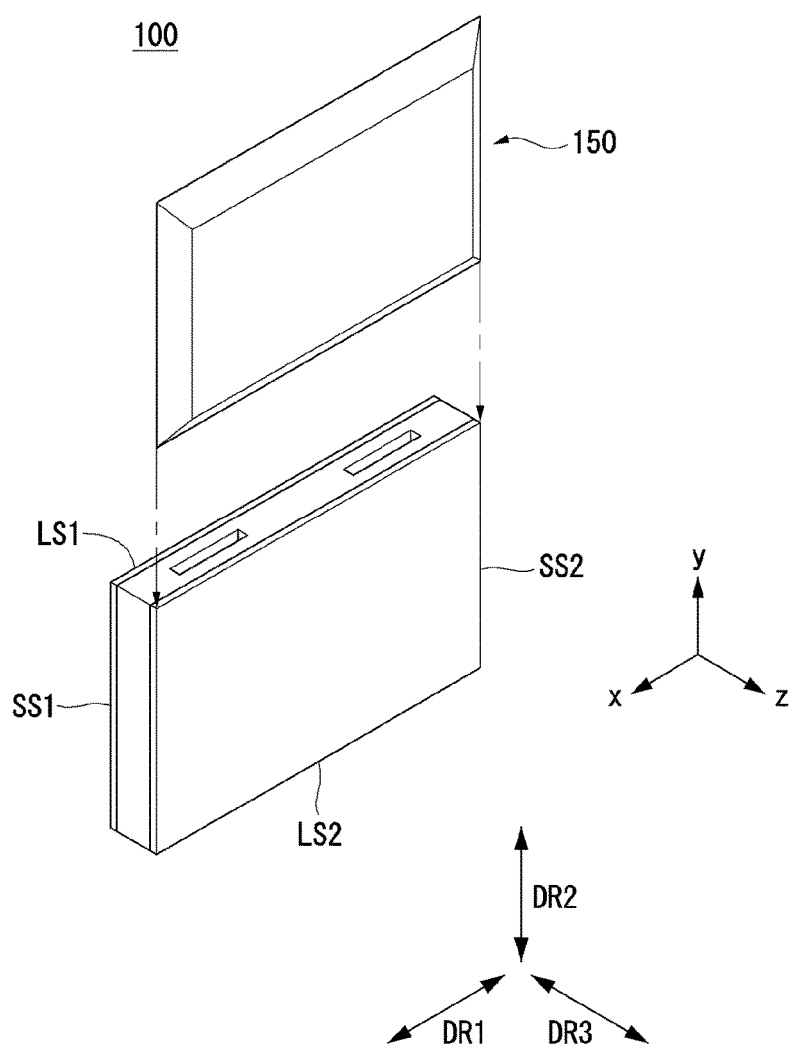

FIGS. 1 and 2 are views showing the display device according to an embodiment of the present invention.

The display device may include a display panel and a back cover. The back cover 150 may be positioned behind the display panel.

The back cover 150 may be coupled to the display panel 110 in a manner of sliding in the second direction DR2 (from the first long side LS1 to the second long side LS2).

In order for the back cover 150 to be coupled with the display panel 110, the back cover 150 and/or other structures adjacent thereto may include protrusions, sliding portions, engaging portions, and the like.

FIGS. 3 to 10 are views showing configurations of the display device related to the present invention.

Figure 3:
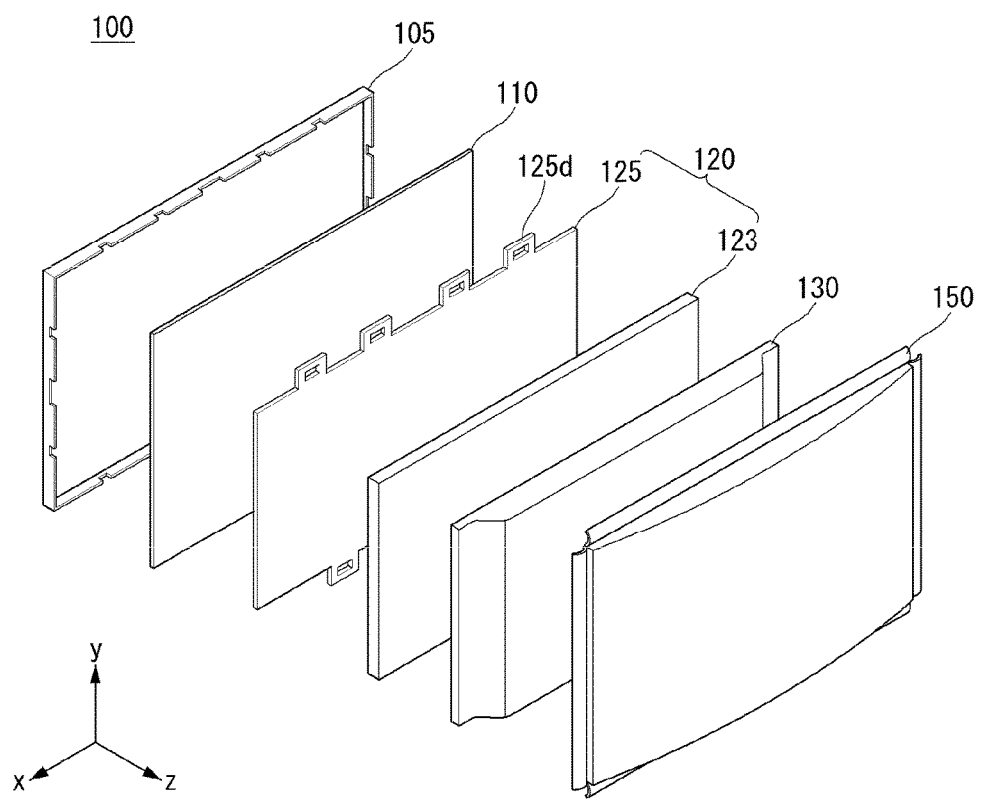
FIGS. 3 to 10 are views showing configurations of the display device related to the present invention.

Referring to FIG. 3, the display device may include a front cover 105, display panel 110, backlight unit 120, frame 130, and back cover 150. The front cover 105 may be referred to as a top case 105.

The front cover 105 may cover at least a part of the front surface and the lateral surface of the display panel 110. The front cover 105 may have a shape of a photo-frame of which central portion is hollow.

The front cover 105 can be divided into a front side cover positioned on the front side of the display panel 110 and a lateral side cover positioned on the lateral side of the display panel 110. The front side cover and the lateral side cover may be separately formed. One of the front side cover or the lateral side cover may be omitted.

The display panel 110 can be positioned at a front portion of the display device 100 and can display an image. The display panel 110 can display an image by outputting RGB (red, green or blue) for each pixel by a plurality of pixels on timing. The display panel 110 may be divided into an active area on which an image is displayed and a de-active area on which an image is not displayed. The display panel 110 may include a front substrate and a rear substrate facing the front substrate. A liquid crystal layer may be positioned between the front and rear substrates.

The front substrate may include a plurality of pixels made up of red (R), green (G), and blue (B) sub-pixels. The front substrate can emit light corresponding to the color of red, green, or blue according to a control signal.

The rear substrate may include switching elements. The rear substrate can switch the pixel electrodes. For example, the pixel electrode can change the molecular arrangement of the liquid crystal layer according to a control signal applied from the outside. The liquid crystal layer may include liquid crystal molecules. The liquid crystal molecules can change the arrangement in accordance with the voltage difference generated between the pixel electrode and the common electrode. The liquid crystal layer may transmit or block the light provided from the backlight unit 120 to the front substrate.

A guide panel 117 (see FIG. 4) may be positioned between the front cover 105 and the display panel 110. The guide panel 117 (see FIG. 4) may be positioned behind the front cover 105. The guide panel 117 (see FIG. 4) may be positioned at a lateral side of the display panel 110.

The guide panel 117 (see FIG. 4) may have various forms. For example, the guide panel 117 (see FIG. 4) may include a shape surrounding an outer circumference of the display panel 110 or a shape corresponding to at least one edge of the display panel 110.

The guide panel 117 (see FIG. 4) may guide a position for assembling of display panel 110. The guide panel 117 (see FIG. 4) may be provided with various structures such as a flange or a rib.

The backlight unit 120 may be positioned at the rear of the display panel 110. The backlight unit 120 may include light sources. The light sources of the backlight unit 120 may be disposed in a direct type or in an edge type. In case of the direct type, the backlight unit 120 may include a diffusion plate.

The backlight unit 120 may be coupled to a front side of a lateral side of the frame 130. For example, the light sources may be disposed at the frame, of which structure may be referred to the edge type.

The backlight unit 120 may be driven in a whole driving manner or a partial driving manner such as local dimming, impulsive, or the like. The backlight unit 120 may include an optical sheet 125 and an optical layer 123.

The optical sheet 125 may transmit light of the light source to the display panel 110 uniformly. The optical sheet 125 may be composed of layers. For example, the optical sheet 125 may include a prism sheet, a diffusion sheet, and the like.

The optical sheet 125 may have a coupling portion 125d. The coupling portion 125d may be coupled to the front cover 105, the frame 130, and/or the back cover 150. Alternatively, the coupling portion 125d may be fastened to a structure which is formed or coupled on the front cover 105, the frame 130, and/or the back cover 150.

The optical layer 123 may include the light sources. The specific configuration will be described later.

The frame 130 may support components of the display device 100. For example, a configuration such as the backlight unit 120 or the like may be coupled to the frame 130. The frame 130 may be made of a metal such as an aluminum alloy.

The back cover 150 may be located at the rear portion of the display device 100. The back cover 150 may be coupled to the frame 130 and/or the front cover 105. For example, the back cover 150 may be an injection-molded material of a resin.

Figure 4:
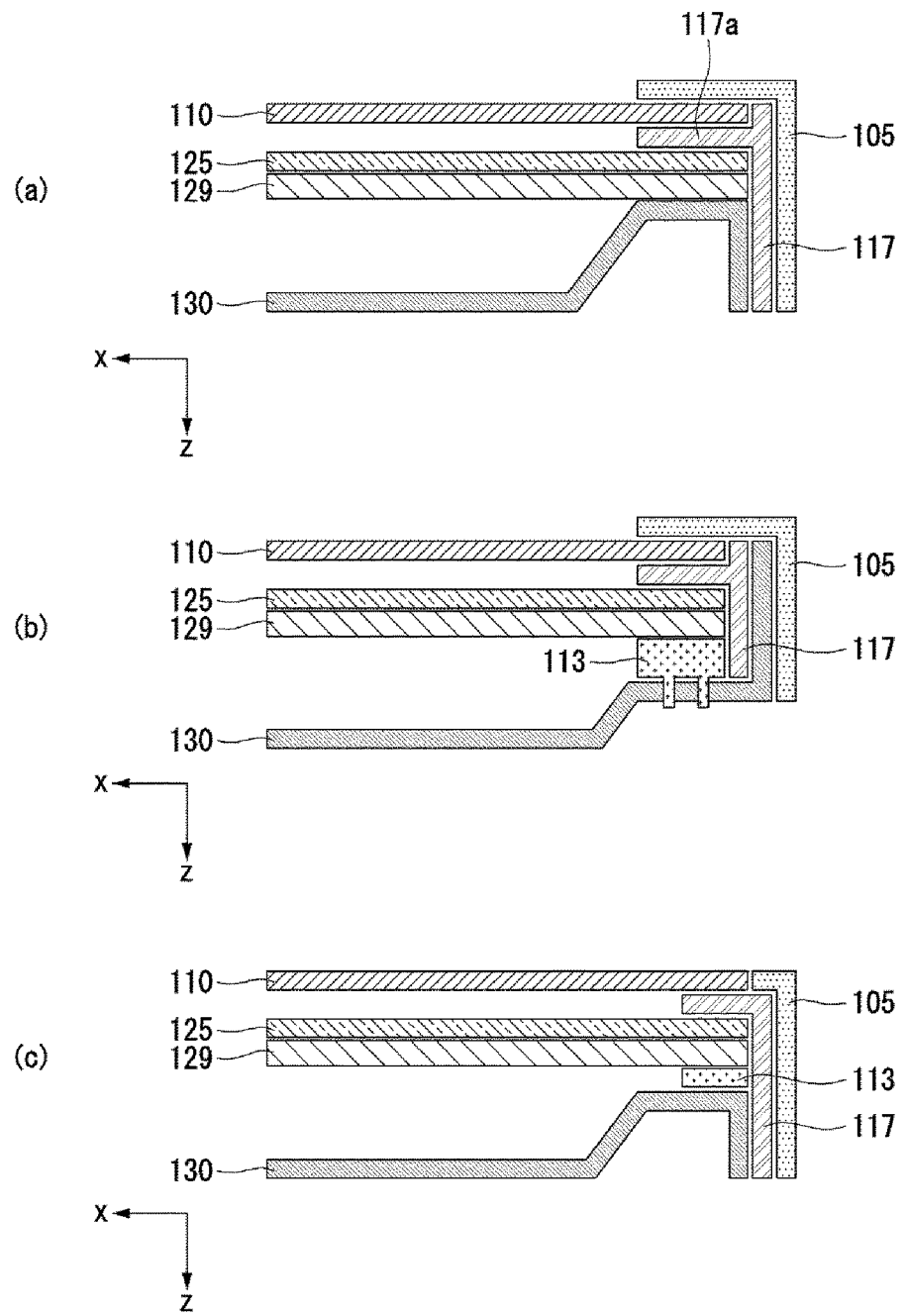
Figure 5:
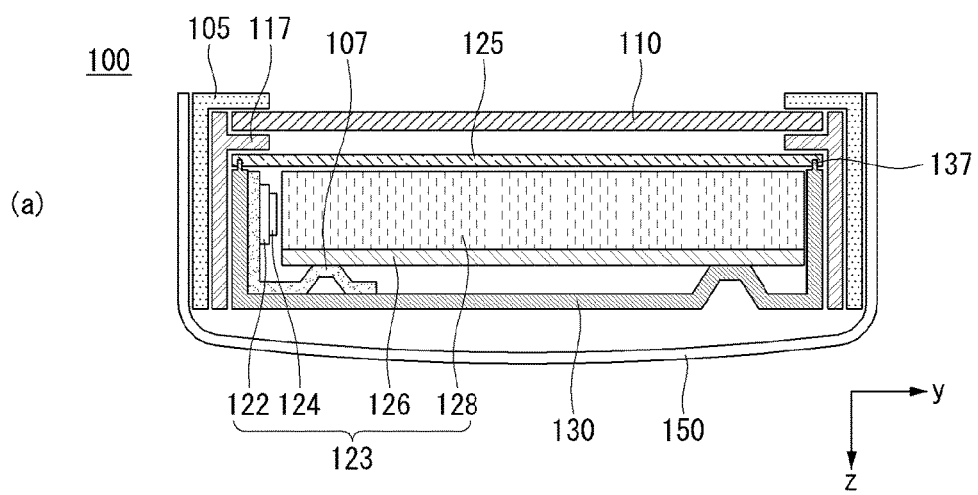
Figure 5:
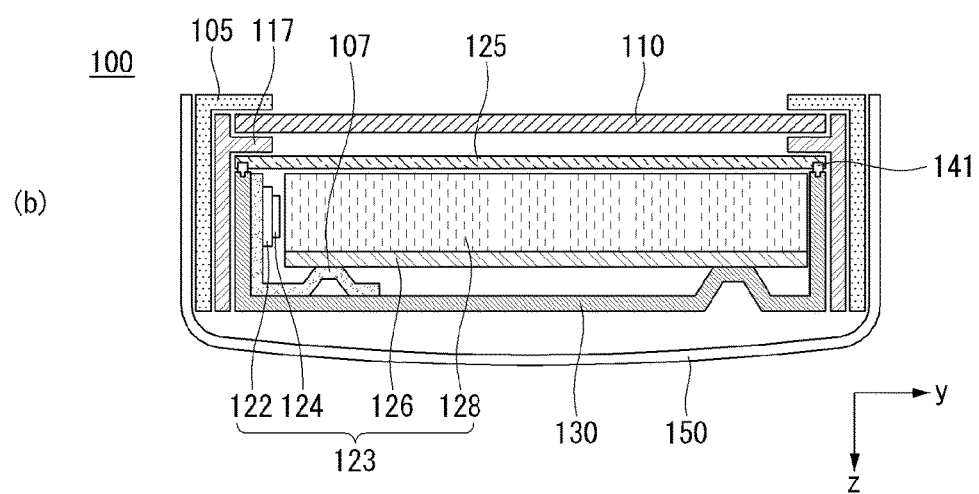

FIGS. 4 and 5 are views showing a configuration of the optical sheet 125 and etc.

Referring to FIG. 4 (a), the optical sheet 125 and/or diffusion plate 129 may be positioned in front of the frame 130. The optical sheet 125 and/or the diffusion plate 129 can be engaged with the frame 130 at an edge of the frame 130. The optical sheet 125 and/or the diffusion plate 129 can be directly seated on the edge of the frame 130. The optical sheet 125 and/or the diffusion plate 129 can be supported by the frame 130. The edge of the optical sheet 125 and/or the diffusion plate 129 can be covered by the first guide panel 117. For example, the optical sheet 125 and/or the diffusion plate 129 may be positioned between the edge of the frame 130 and the flange 117a of the first guide panel 117.

In front of the optical sheet 125, the display panel 110 can be positioned. Edges of the display panel 110 may be coupled to the first guide panel 117. Edges of the display panel 110 may be supported by the first guide panel 117.

An edge area of the front surface of the display panel 110 may be covered by the front cover 105. For example, a part of the display panel 110 can be positioned between the first guide panel 117 and the front cover 105.

Referring to FIG. 4 (b), the optical sheet 125 can be coupled to the second guide panel 113. That is, the second guide panel 113 may be coupled to the frame 130, and the optical sheet 125 and/or the diffusion plate 129 may be coupled to the second guide panel 113. The second guide panel 113 may be made of a different material from the frame 130. The frame 130 may be configured to enclose the first and second guide panels 117 and 113 or to contain first and second guide panels 117 and 113. The first or second guide panel 117 or 113 may be referred to as a holder or a support member.

Referring to FIG. 4 (c), the front cover 105 may not cover the front surface of the display panel 110. The front cover 105 may be positioned on the lateral side of the display panel 110.

Referring to FIG. 5 (a), the optical layer 123 may include a substrate 122, a reflective sheet 126, an optical assembly 124, and a light guide plate 128.

The optical layer 123 may be located on the frame 130. For example, the optical layer 123 may be located between the frame 130 and the optical sheet 125. The optical layer 123 can be supported by the frame 130. The frame 130 may be curved partially. The frame 130 may protrude in the direction of the optical layer 123. The frame 130 may support the optical layer 123.

The substrate 122 may be accommodated at the frame 130. The substrate 122 may be coupled to a housing 107 located between the substrate 122 and the frame 130. For example, the substrate 122 may be coupled to at least one of the first guide panel 117, the frame 130, the top case 105, and the housing 107.

The housing 107 may be located at a lower portion of the frame 130. The housing 107 may be bent at the lower portion of the frame 130 and extend to the rear surface of the frame 130. A portion of the housing 170 that faces the rear surface of the frame 130 can support the reflective sheet 126. For example, the housing 107 may support one side of the reflective sheet 126, and the frame 130 may support the other side of the reflective sheet 126. The portion of the housing 170 that faces the rear surface of the frame 130 may be partially curved and protrude toward the reflective sheet 126.

The substrate 122 may be positioned at lateral sides of the reflective sheet 126 and/or the light guide plate 128. The substrate 122 and the reflective sheet 126 and/or the light guide plate 128 may be spaced apart.

The optical sheet 125 can be fixe to the frame 130. For example, the optical sheet 125 can be fixed to the fixing portion 137 of the frame 130.

The fixing portion 137 may be provided on the side wall of the frame 130. The fixing portion 137 can be protruded from the side wall of the frame 130 toward the optical sheet. The fixing portions 137 located on both side walls of the frame 130 can fix both sides of the optical sheet 125.

Referring to FIG. 5 (b), the optical sheet 125 can be coupled to the frame 130 by the mold 141. The mold 141 may be coupled to the side wall of the frame 130 and the optical sheet 125 may be coupled to the mold 141.

Figure 6:
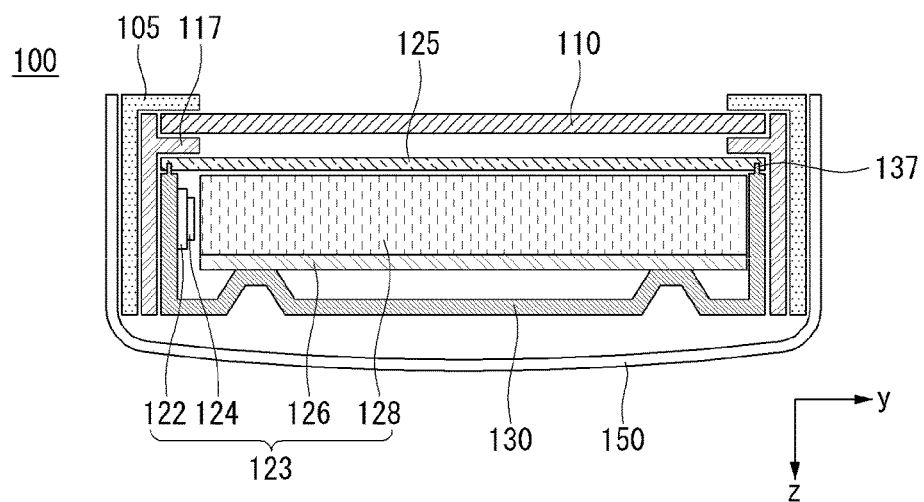

Referring to FIG. 6, the substrate 122 may be directly coupled to the frame 130.

Since the frame 130 is directly bonded to the substrate 122, both sides of the optical layer 123 can be supported. The back surface of the frame 130 can be partially bent. The bent portion of the frame 130 can be protruded toward the reflective sheet 126 and can support the reflective sheet 126.

When the frame 130 is directly coupled to the substrate 122, there is no medium structure between the frame 130 and the substrate 122, so that the inner space of the frame 130 can be utilized more widely.

Figure 7:
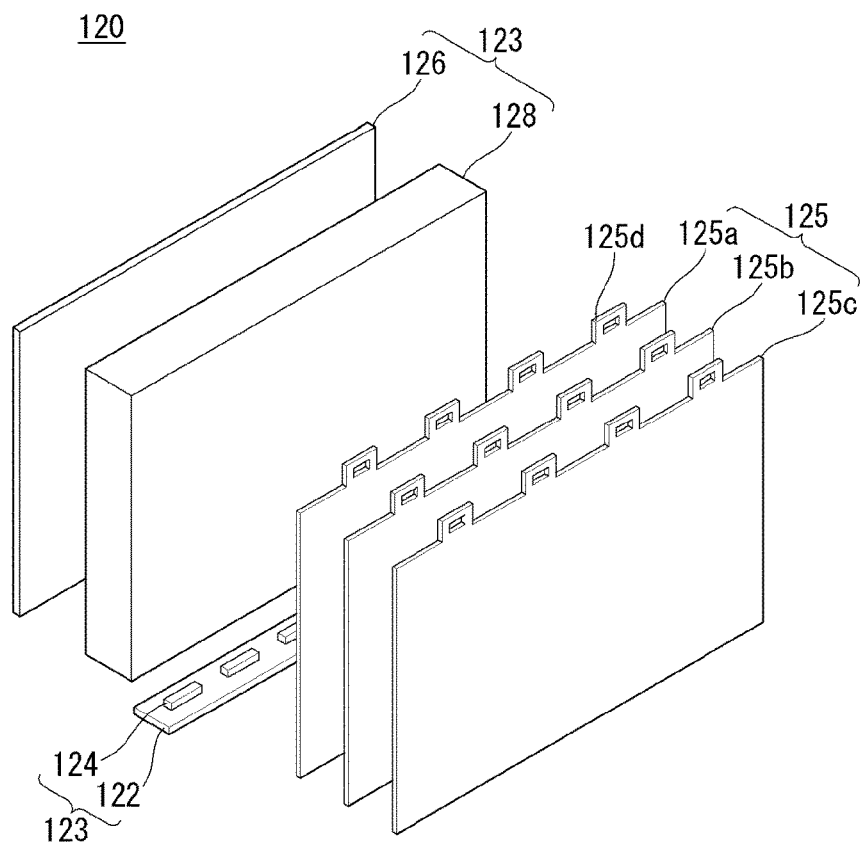
Figure 8:
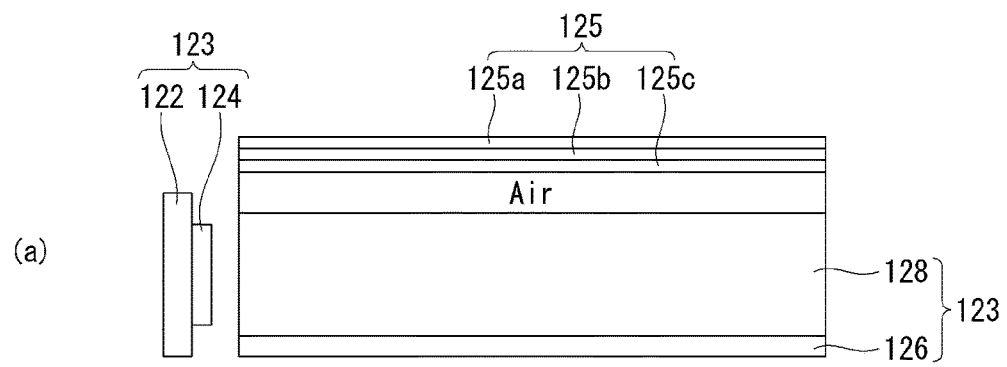
Figure 8:
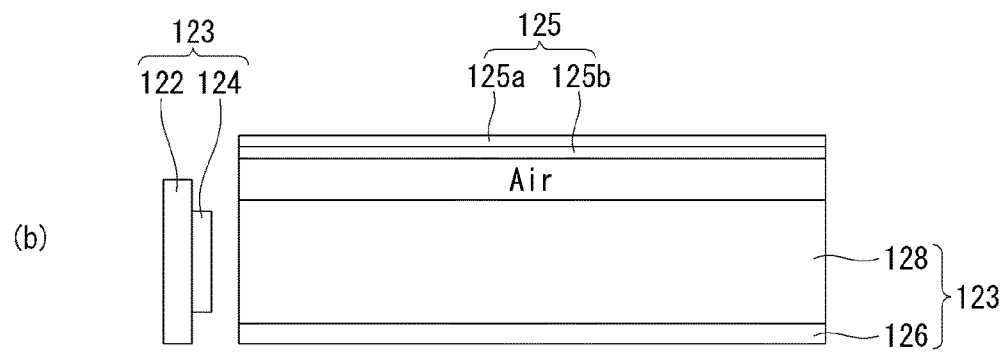

Referring to FIGS. 7 and 8, the backlight unit may include a substrate 122, at least one optical assembly, an optical layer 123 having a reflective sheet 126 and a light guide plate 128, and an optical sheet positioned in front of the optical layer.

The substrate 122 may be located on at least one side of the other configuration of the optical layer 123.

The optical assembly 124 or the optical assemblies 124 may be mounted on the substrate 122. An electrode pattern for connecting the adapter to the optical assembly 124 may be formed on the substrate 122. For example, a carbon nano tube electrode pattern for connecting the optical assembly 124 to the adapter may be formed on the substrate 122.

The substrate 122 may be composed of at least one of polyethylene terephthalate (PET), glass, polycarbonate (PC), and silicon. For example, the substrate 122 may be a printed circuit board (PCB).

Optical assemblies 124 may be disposed on the substrate 122. The optical assembly 124 may be smaller than the thickness of the light guide plate 128. Therefore, most of the light provided from the optical assembly 124 can be transmitted to the light guide plate 128.

The optical assembly 124 may include a light emitting diode (LED) chip. The optical assembly 124 may be a light emitting diode package. The light emitting diode package may include a light emitting diode chip.

The optical assembly 124 may comprise a colored LED (emitting at least one of the colors such as red, blue, green, etc.) or a white LED. The colored LED may include at least one of red LED, blue LED, or green LED.

The light source included in the optical assembly 124 may be a COB (Chip On Board) type. The COB type may be a form in which an LED chip (a light source) is directly coupled to the substrate 122. Therefore, the process can be simplified. In addition, the electric resistance can be lowered, thereby reducing electric energy lost by heat. The power efficiency of the optical assembly 124 can be increased. The optical assembly 124 in COB type can provide a brighter light. The optical assembly in COB type can be made thinner and lighter than light source in conventional type.

The light guide plate 128 can spread the light incident from the optical assembly 124 widely. A lower surface of the light guide plate 128 may have a stepped portion. The lower surface of the light guide plate 128 may face the optical assembly 124. The lower surface of the light guide plate 128 may be slanted.

The reflective sheet 126 may be positioned behind the light guide plate 128. The reflective sheet 126 may reflect light provided from the optical assembly 124. The reflective sheet 126 can reflect the light introduced from the light guide plate 128 to the front side of the light guide plate 128.

The reflective sheet 126 may include at least one of a metal and a metal oxide which are reflective materials. For example, the reflective sheet 126 may include a metal and/or a metal oxide having a high reflectance such as aluminum (Al), silver (Ag), gold (Au), and titanium dioxide (TiO2).

The reflective sheet 126 may be formed by depositing and/or coating a metal or metal oxide. The reflective sheet 126 may be printed with an ink containing a metal material. The reflective sheet 126 may have a vapor deposition layer formed by using a vacuum deposition method such as a thermal evaporation method, an evaporation method, or a sputtering method. A coating layer and/or a printing layer by using a printing method, a gravure coating method, or a silk screen method, may be formed on the reflective sheet 126.

A diffusion plate (not shown) may be further provided at the front side of the light guide plate 128. The diffusion plate can diffuse the light emitted from the light guide plate 128 forward.

An air gap may be located between the light guide plate 128 and the optical sheet 125. The air gap can disperse the light emitted from the optical assembly 124. A resin can be deposited on the optical assembly 124 and/or the reflective sheet 126. The resin can diffuse the light provided from the optical assembly 124.

The optical sheet 125 may be positioned in front of the light guide plate 128. The rear surface of the optical sheet 125 may face the light guide plate 128. The front surface of the optical sheet 125 may face the rear surface of the display panel 110.

The optical sheet 125 may include at least one sheet. The optical sheet 125 may include one or more prism sheets and/or one or more diffusion sheets. The plurality of sheets included in the optical sheet 125 may be in an adhered state and/or in close contact with each other.

For example, the optical sheet 125 may include first to third optical sheets 125a to 125c. The first optical sheet 125a may be a diffusion sheet, and the second and third optical sheets 125b and 125c may be a prism sheet. The number and/or position of the diffusion sheet and the prism sheet can be changed.

The diffusion sheet can prevent the light from the light guide panel 128 from being partially concentrated, thereby can make the distribution of light more uniform. The prism sheet can collect light from the diffusion sheet to provide light to the display panel 110.

The coupling portion 125d may be formed at an edge of the optical sheet 125. The coupling portion 125d may be formed on at least one of the first to third optical sheets 125a to 125c.

The coupling portion 125d may be formed at the long side of the optical sheet 125. The first long side of the optical sheet 125 may be opposite to the second long side of the optical sheet 125. The coupling portion 125d formed on the first long side may be asymmetric with the coupling portion 125d formed on the second long side. For example, the position and/or number of the coupling portion 125d at the first long side may different from the position and/or number of the coupling portion 125d at the second long side.

Figure 9:
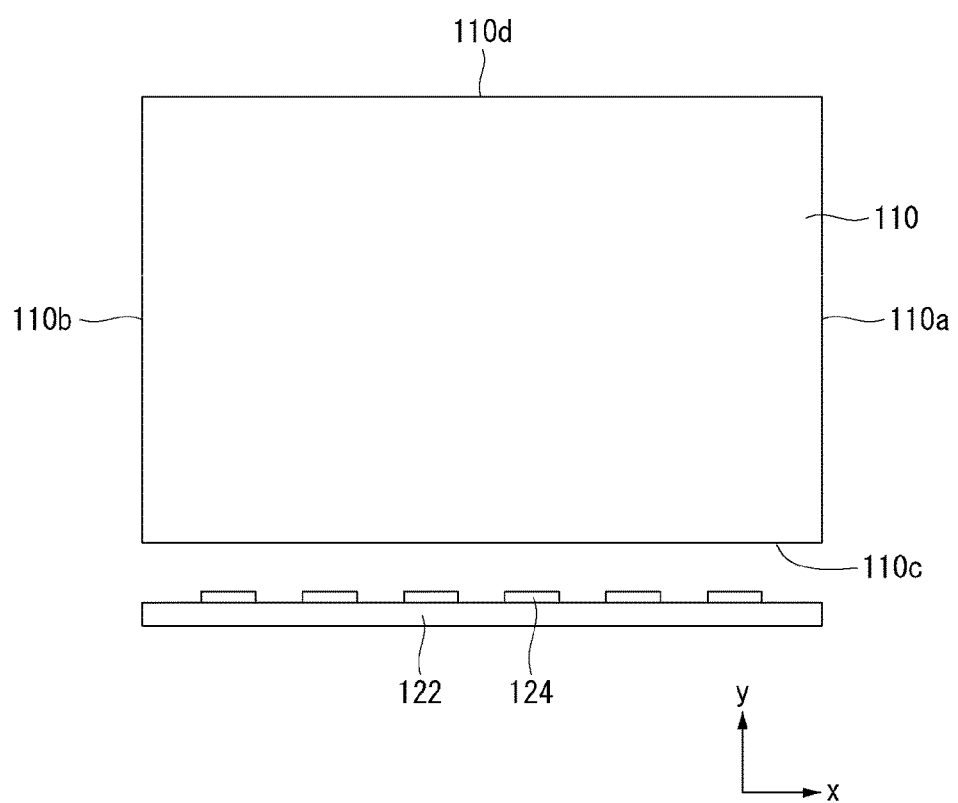
Figure 10:
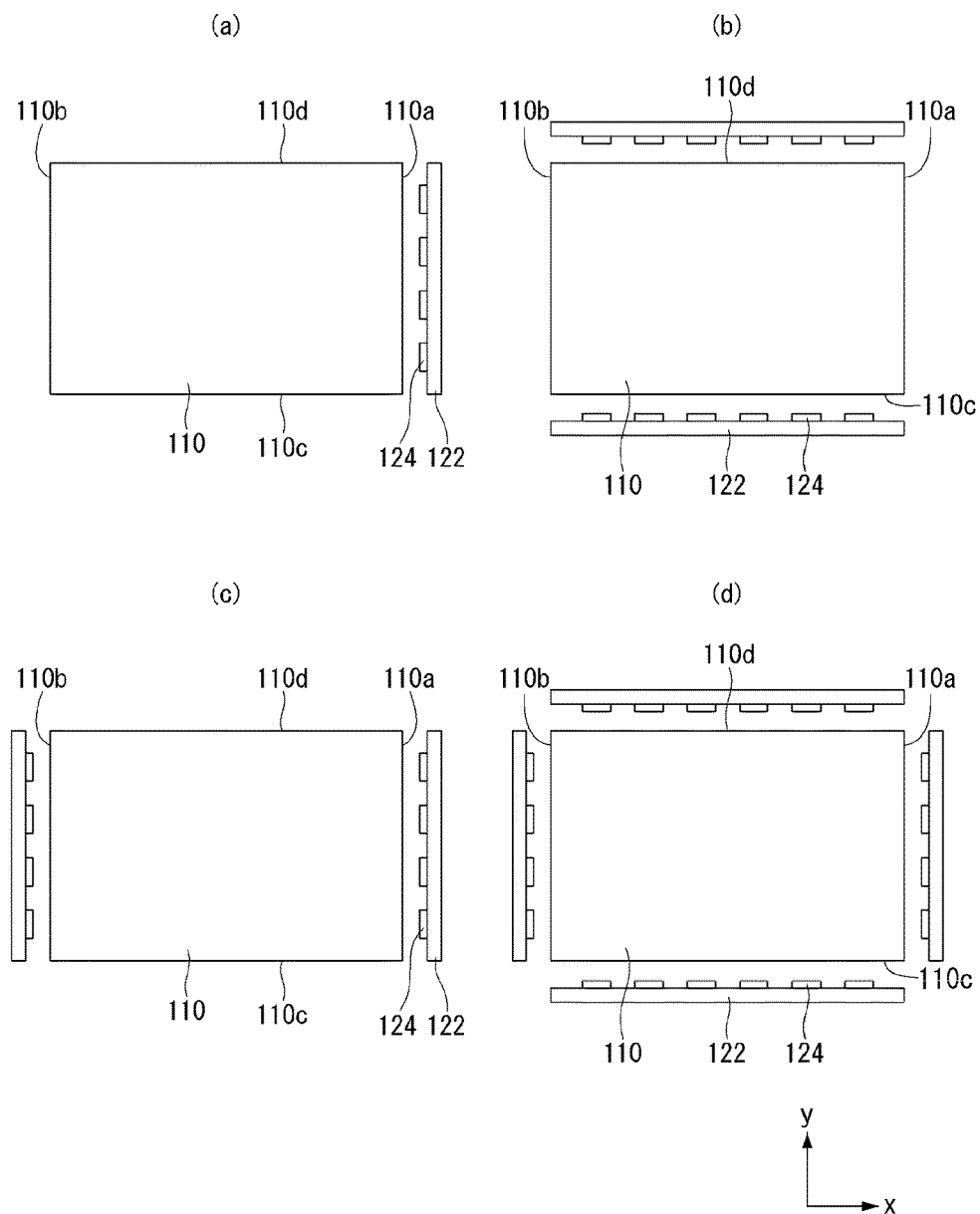

Referring to FIGS. 9 and 10, the substrate 122 and the optical assembly 124 may be positioned adjacent to the lower side 110c of the display panel 110. The backlight unit 120 of which the optical assembly 124 is disposed at the lateral side of the display panel 110 may be referred to as an edge typed backlight unit.

Referring to FIG. 9, the optical assembly 124 may provide light from the lower side 110c to the upper side 110d of the display panel 110. The light provided in the optical assembly 124 may diffuse from the lower side 110c of the display panel 110 to the upper side 110d. The optical assembly 124 may provide light to the entire display panel 110. The optical assembly 124 may be positioned at the upper side 110d, or at the left side 110b, or at the right side 110a.

Referring to FIG. 10 (a), the optical assembly 124 may be located on the right side 110a of the display panel 110. In another example, the optical assembly 124 may be located on the left side 110b of the display panel 110.

Referring to FIG. 10 (b), the optical assembly 124 may be located on the lower side 110c and the upper side 110d of the display panel 110. Referring to FIG. 10 (c), the optical assembly 124 may be located on the right side 110a and the left side 110b of the display panel 110.

Referring to FIGS. 10 (b) and (c), the backlight unit 120 of which optical assemblies 124 are disposed at two opposite edges of the display panel 110 may be referred to as a dual typed backlight unit. In the dual typed backlight unit 124, the light can be provided to the display panel easily.

Referring to FIG. 10 (d), the optical assembly 124 may be positioned on four sides of the display panel 110. In case that the optical assembly 124 is located on four sides of the display panel 110, the light provided in the optical assembly 124 may be more easily diffused.

Figure 11:
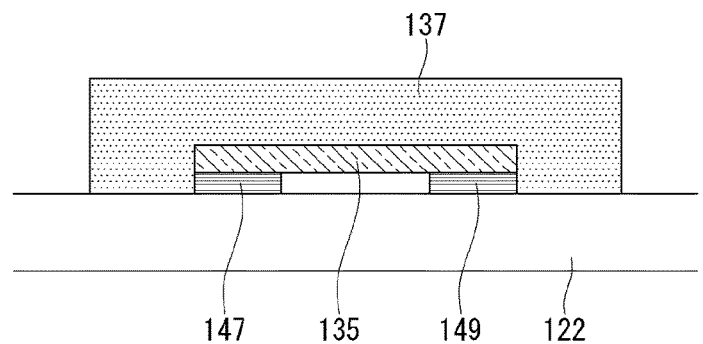
FIGS. 11 and 12 are views showing a light source according to an embodiment of the present invention.
Figure 12:
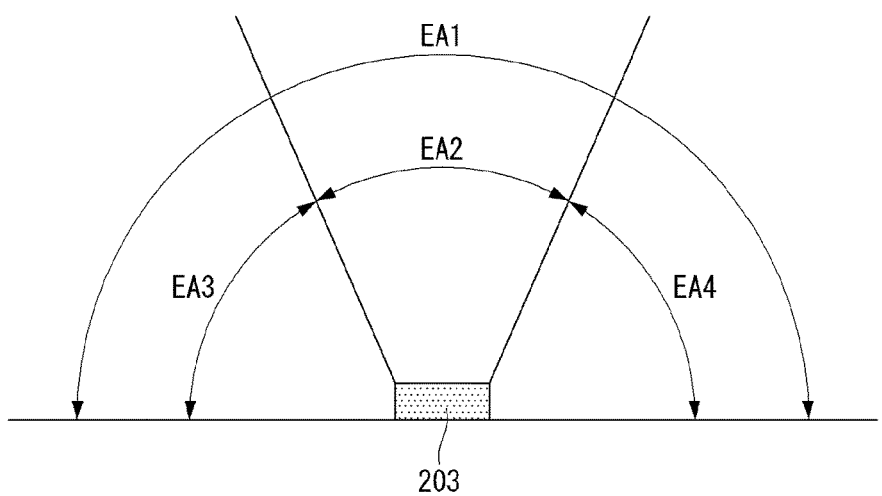

FIGS. 11 and 12 are views showing a light source according to an embodiment of the present invention.

Referring to FIG. 11, the light source 203 may be of a COB type. The light source 203 of COB type may include at least one of the light emitting layer 135, the first and second electrodes 147 and 149, and the fluorescent layer 137.

The light emitting layer 135 may be located on the substrate 122. The light emitting layer 135 may emit light of any one of blue, red, and green. The light emitting layer 135 may be formed of a material selected from the group consisting of Firpic, (CF3ppy) 2Ir (pic), 9,10-di (2-naphthyl) anthracene (AND), Perylene, distyrybiphenyl, PVK, OXD-7, UGH- or the like.

The first and second electrodes 147 and 149 may be positioned between the light emitting layer 135 and the substrate 122. The first and second electrodes 147 and 149 can transmit a signal to the light emitting layer 135.

The fluorescent layer 137 can cover the light emitting layer 135 and the first and second electrodes 147 and 149. The fluorescent layer 137 may include a fluorescent material that converts the light of the spectrum generated from the light emitting layer 135 into white light. The thickness of the light emitting layer 135 in a direction from the fluorescent layer 137 to the substrate 122 can be uniform. The fluorescent layer 137 may have a refractive index of 1.4 to 2.0.

The light source 203 of COB type can be directly mounted on the substrate 122. Thus, the size of the optical assembly 124 can be reduced.

Since the light source 203 is positioned on the substrate 122 and the heat radiation is excellent, the light source 203 can be driven with relatively high electrical current. Accordingly, it is possible to reduce the number of light sources 203 required to secure the same light amount.

Since the light source 203 is mounted on the substrate 122, a wire bonding process may not be required. Thus, the cost can be saved by simplifying the process.

Referring to FIG. 12, the light emission range of the light source 203 may be the first emission range EA1. The first light emission range EA1 may include a second light emission range EA2 which is a front side and a third and fourth light emission ranges EA3 and EA4 which are lateral sides. On the other hand, the light emission range of a conventional light source (for example, a POB type light source) may be the second light emission range EA2. That is, the light emission range of the light source 203 according to the embodiment of the present invention may be greater than the light emission range of the conventional light source.

Figure 13:
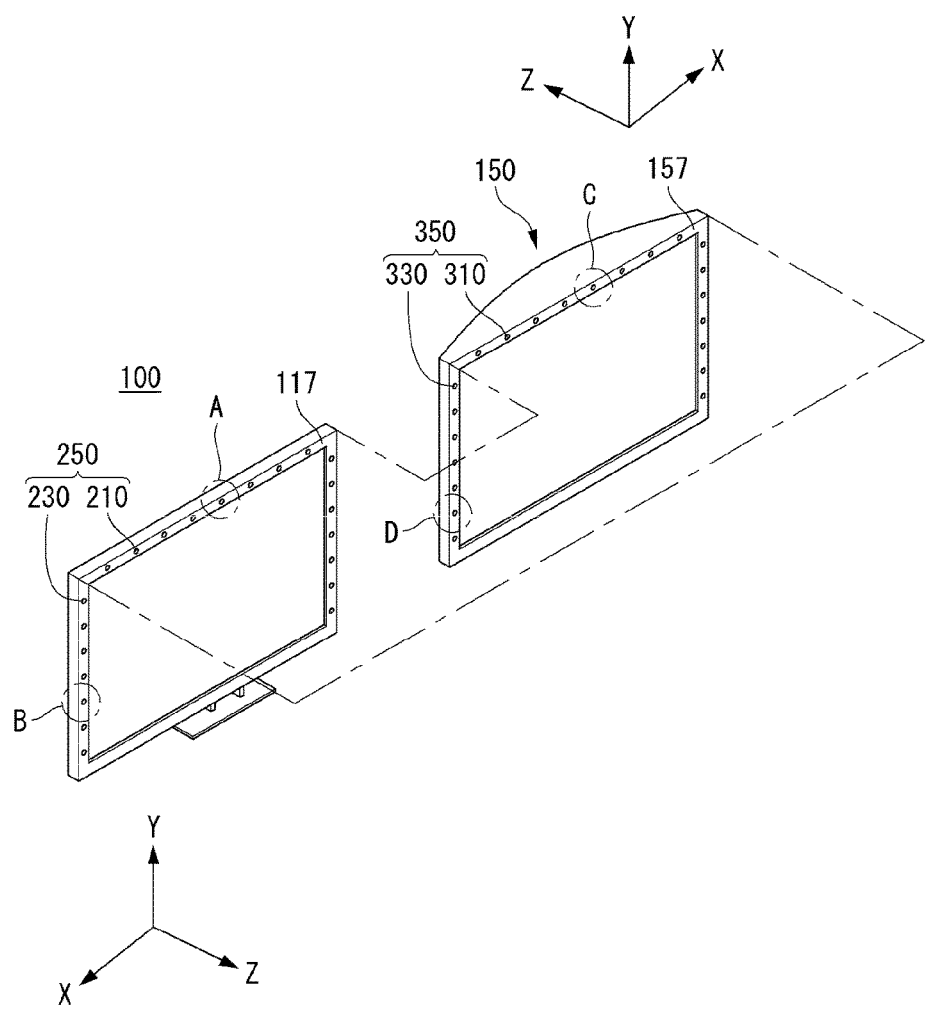
FIGS. 13 and 14 are views showing a display device according to an embodiment of the present invention.
Figure 14:
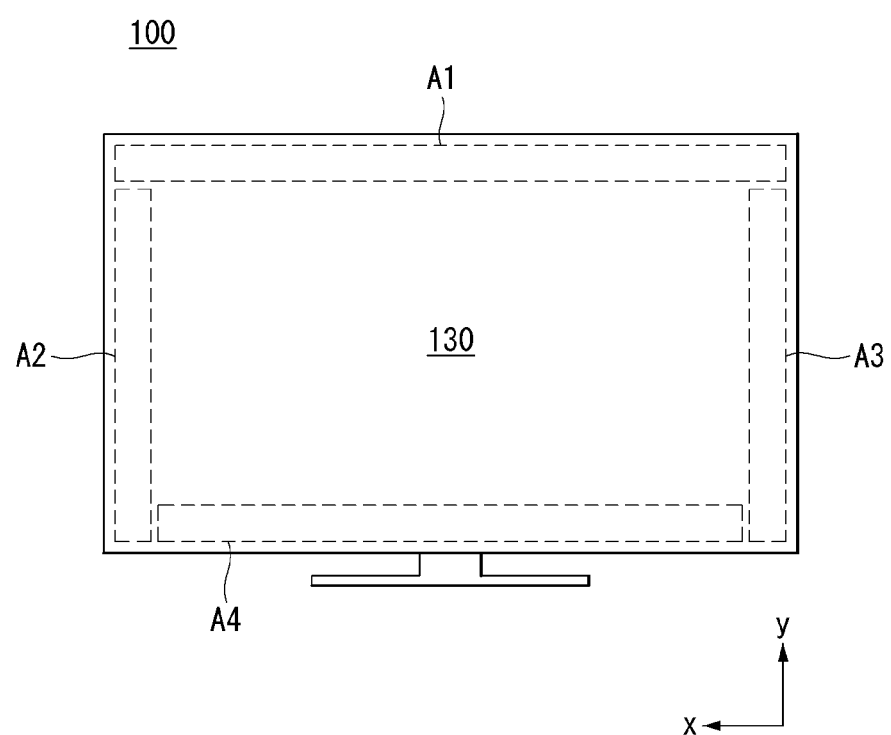

FIGS. 13 and 14 are views showing a display device according to an embodiment of the present invention.

The guide panel 117 may be formed to be corresponding to the back cover 150. The latch assemblies 250 and 350 may allow the guide panel 117 to engage the back cover 150.

The latch assemblies 250 and 350 can be engaged with the back cover 150 without using a extra coupling member such as a screw. Therefore, a process for assembling a extra coupling member such as a screw can be omitted. In addition, since the extra coupling member such as a screw is omitted, the manufacturing cost of the display device 100 can be reduced.

The latch assemblies 250, 350 may include a guide latch assembly 250 and a back cover latch assembly 350. The guide and latch assembly 250 may be located at the guide panel 117. The back cover latch assembly 350 may be located at the back cover 150. The guide latch assembly 250 may be formed at a position corresponding to the back cover assembly 350. When the back cover 150 is brought close to the rear of the display device 100, the back cover latch assembly 350 can be coupled to the guide latch assembly 250. When the back cover assembly 350 is coupled to the guide latch assembly 250, the back cover 150 can be coupled to the guide panel 117. The movements of the back cover 150 in the lateral direction, the longitudinal direction and/or the thickness direction with respect to the guide panel 117 can be restricted.

Referring to FIG. 13, a guide latch assembly 250 may be formed on the guide panel 117. The guide latch assembly 250 may include a first guide latch 210 and a second guide latch 230.

The first guide latch 210 can be disposed in the horizontal direction of the display device 100. The first guide latch 210 may be disposed along the upper long edge and/or the lower long edge of the display device 100. For example, the first guide latch 210 may be disposed on the guide panel 117 along the upper long edge of display device 100.

The first guide latch 210 may be at least one. The first guide latches 210 may be plural. The plurality of first guide latches 210 may be disposed to be spaced apart from each other.

The first guide latch 210 can be formed or molded together with the guide panel 117. The first guide latch 210 may be formed separately from the guide panel 117 and attached to the guide panel 117. For example, the first guide latch 210 can be bonded to the guide panel 117 with an adhesive or the like.

The second guide latch 230 may be disposed in the vertical direction of the display device 100. The second guide latch 230 may be disposed along the left short edge and/or right short edge of the display device 100.

The second guide latch 230 may be at least one. The second guide latch 230 may be plural. The plurality of second guide latches 230 may be spaced apart from each other.

The second guide latch 230 can be formed or molded together with the guide panel 117. The second guide latch 230 may be formed separately from the guide panel 117 and attached to the guide panel 117.

The back cover latch assembly 350 may be formed on the back cover 150 of the display device 100. For example, the back cover latch assembly 350 may be formed at an edge region 157 of the back cover 150. The back cover latch assembly 350 may include a first back cover latch 310 and a second back cover latch 330.

The first back cover latch 310 can be disposed in the horizontal direction of the back cover 150. The first back cover latch 310 may be formed at a position corresponding to the first guide latch 210.

The second back cover latch 330 can be disposed in the vertical direction of the back cover 150. The second back cover latch 330 may be formed at a position corresponding to the second guide latch 230.

At least one of the first and second back cover latches 310 and 330 may be integrally formed with the back cover 150. At least one of the first and second back cover latches 310 and 330 may be formed separately from the back cover 150 and attached to the back cover 150.

Referring to FIG. 14, the rear surface of the display device 100 may be divided into a plurality of regions. For example, the rear surface of the display device 100 with the back cover 150 removed may be divided into a plurality of regions. For example, the rear surface of the frame 130 may be divided into first to fourth areas A1 to A4.

The first to fourth areas A1 to A4 may be horizontal and/or vertical outer circumference areas of the display device 100. The first and fourth areas A1 and A4 may be adjacent to the upper and lower edges of the display device 100. The second and third areas A2 and A3 may be adjacent to the left and right edges of the display device 100.

The guide latch assembly 250 may be positioned on at least one of the first to fourth areas A1 to A4. The first guide latch 210 may be disposed in the first and/or the fourth area A1 and A4. The second guide latch 230 may be disposed in the second and/or third regions A2 and A3.

FIGS. 15 to 24 are views showing a coupling structure of a display device according to an embodiment of the present invention.

The display device 100 may include a coupling structure that allows the back cover 150 to be easily attached hereto.

Figure 15:
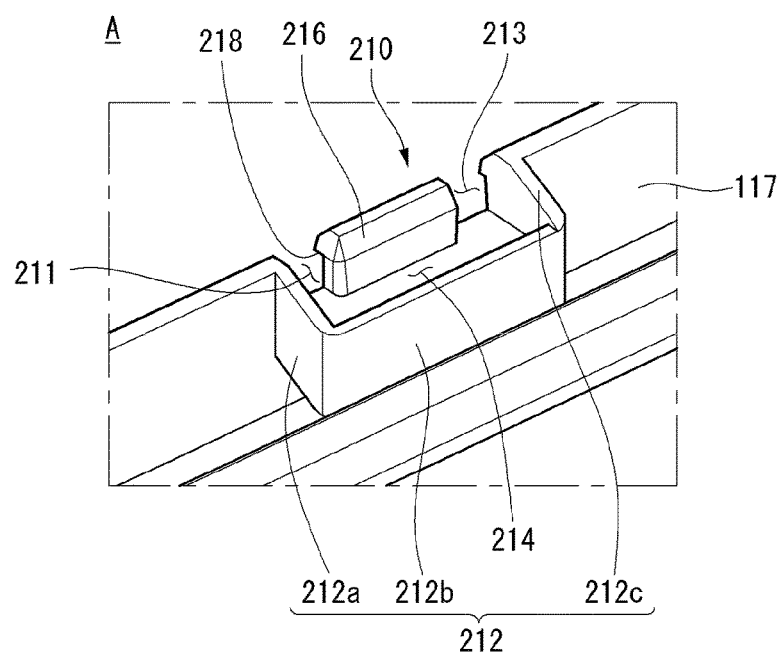
FIGS. 15 to 24 are views showing a coupling structure of a display device according to an embodiment of the present invention.

FIG. 15 is a view showing a portion of the first guide latch 210.

The first guide latch 210 may include a plurality of shielding ribs 212 and 216 disposed on the guide panel 117.

The shielding ribs 212 and 216 may be formed integrally with the guide panel 117, or formed separately from the guide panel 117 and then attached to the guide panel 117. The shielding ribs 212 and 216 may include a first shielding rib 212 and a second shielding rib 216.

The first shielding rib 212 may comprise first-a, first-b, and first-c shielding ribs 212a, 212b, 212c. The first-a, first-b, and first-c shielding ribs 212a, 212b and 212c may be disposed to be connected to the other sequentially. For example, the first-b shielding rib 212b may be positioned between the first-a shielding rib 212a and the first-c shielding rib 212c. The first-a shielding rib 212a may be referred to as a first sidewall shielding rib. The first-c shielding rib 212c may be referred to as a second sidewall shielding rib. The first-b shielding rib 212b may be referred to as a roof shielding rib. The roof shielding rib may connect the first sidewall shielding rib 212a and the second sidewall shielding rib 212c.

The second shielding rib 216 may be spaced apart from the first shielding rib 212. For example, the second shielding rib 216 may be spaced apart from the first-b shielding rib 212b and positioned alongside of the first-b shielding rib 212b.

The second shielding rib 216 may further include an hooking protrusion 218. The hooking protrusion 218 may be formed on the outer side of the second shielding rib 216. For example, the hooking protrusion 218 may protrude toward opposite to the first shielding rib 212. For example, the hooking protrusion 218 may protrude toward opposite to the first-b shielding rib 212b.

In the first and second shielding ribs 212 and 216, coupling regions 211, 213 and 214 may be formed. The coupling regions 211, 213 and 214 may be a space formed between the first shielding rib 212 and the second shielding rib 216. The coupling regions 211, 213, 214 may be referred to as coupling spaces 211, 213, 214.

The first coupling region 211 may be positioned between the first-a shielding rib 212a and the second shielding rib 216. The second coupling region 213 may be positioned between the first-c shielding rib 212c and the second shielding rib 216. The third coupling region 214 may be positioned between the first-b shielding rib 212b and the second shielding rib 216.

Figure 16:
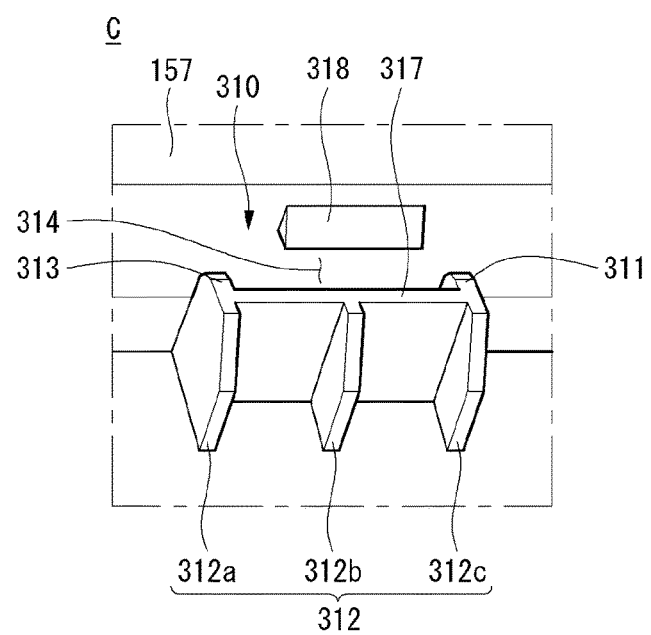

FIG. 16 is a view showing a portion of the first back cover latch 310.

The first back cover latch 310 may include a plurality of coupling ribs 311, 312, 313, and 318 disposed in the inner region 157 of the back cover 150.

The coupling ribs 311, 312, 313 and 318 may be coupled to the shielding ribs 212 and 216 of the first guide latch 210. When the coupling ribs 311, 312, 313 and 318 are coupled to the shielding ribs 212 and 216, the back cover 150 can be coupled to the guide panel 117. The horizontal and/or vertical movement of the back cover 150 can be restricted by the engagement of the coupling ribs 311, 312, 313, and 318 with the shielding ribs 212 and 216. For example, movement of the back cover 150 in the X and/or Y directions may be confined. The back cover 150 can be stably coupled to the rear portion of the display device 100. The coupling ribs 311, 312, 313 and 318 may include first to fourth engaging ribs 311, 312, 313 and 318.

The first and third coupling ribs 311 and 313 and the second coupling rib 312 may be formed to be extended opposite directions. The first and third coupling ribs 311 and 313 may extend to a side of the central rib 317 and the second coupling rib 312 may extend to another side of the central rib 317. The second coupling rib 213 may include second-a, second-b, and second-c coupling ribs 312a, 312b, and 312c.

The first and third coupling ribs 311 and 313 can be inserted into the first and second coupling regions 211 and 213 of the first guide latch 210. The coupling ribs 312a, 312b, and 312c may be in contact with the first shielding ribs 212 of the first guide latch 210.

The fourth coupling rib 318 may be spaced apart from the first, second, and third coupling ribs 311, 312, and 313. The central rib 317 may be positioned between the fourth coupling rib 318 and the second coupling rib 312. The fourth coupling rib 318 may be adjacent to the first and third coupling ribs 311, 313.

The fourth coupling rib 318 can be engaged with the hooking protrusion 218 of the second shielding rib 216. When the fourth coupling rib 318 is coupled to the hooking protrusion 218, movement of the back cover 150 in the Z direction can be restricted. A coupling space 314 is also shown in FIG. 16.

Figure 17:
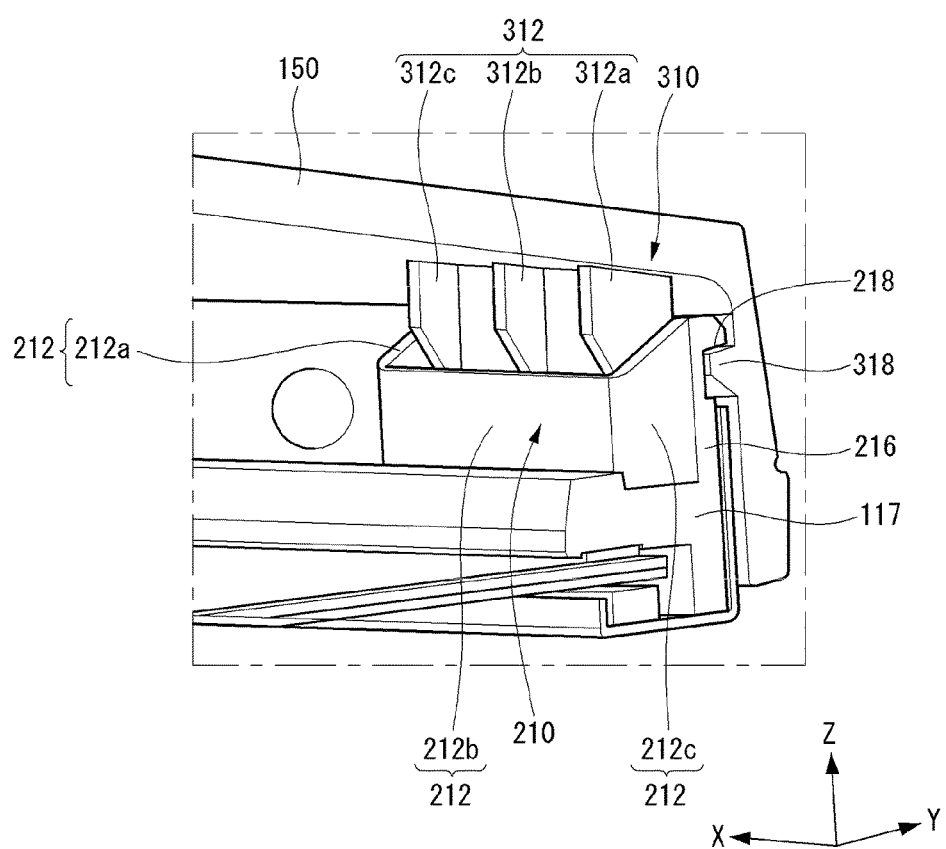

FIG. 17 is a partial cross-sectional view showing a state in which the first guide latch 210 is coupled with the first back cover latch 310. When the first guide latch 210 is engaged with the first back cover latch 310, movement of the back cover 150 in the X direction and/or the Y direction and/or the Z direction can be restricted.

The first back cover latch 310 can be coupled to the first guide latch 210. The second coupling rib 312 of the first back cover latch 310 may be in contact with the first-b shielding rib 212b of the first guide latch 210. The second coupling rib 312 of the first back cover latch 310 can be accommodated between the first-b shielding rib 212b and the second shielding rib 216 of the first guide latch 210.

The second-a coupling rib 312a may be in contact with the first-b and first-c shielding ribs 212b, 212c. The second-c coupling rib 312c may be in contact with the first-a and first-b shield ribs 212a and 212b. The second coupling rib 312 may be disposed between the first-a shielding rib 212a and the first-c shielding rib 212c. The movement of the first back cover latch 310 in the X-direction can be constrained. The movement of the first back cover latch 310 in the horizontal direction can be constrained.

The second-b coupling rib 312b may be accommodated between the first-b shielding rib 212b and the second shielding rib 216. A side of the second-b coupling rib 312b may be in contact with the first-b shielding rib 212b. Another side of the second-b coupling rib 312b may be in contact with the second shielding rib 216. The movement of the first back cover latch 310 in the Y-direction can be constrained. The movement of the first back cover latch 310 in the vertical direction can be constrained.

The hooking protrusion 218 of the second shielding rib 216 can be coupled to the fourth coupling rib 318 of the back cover 150. The movement of the first back cover latch 310 in the Z-direction can be constrained. The movement of the first back cover latch 310 in the front-back direction can be constrained.

Figure 18:
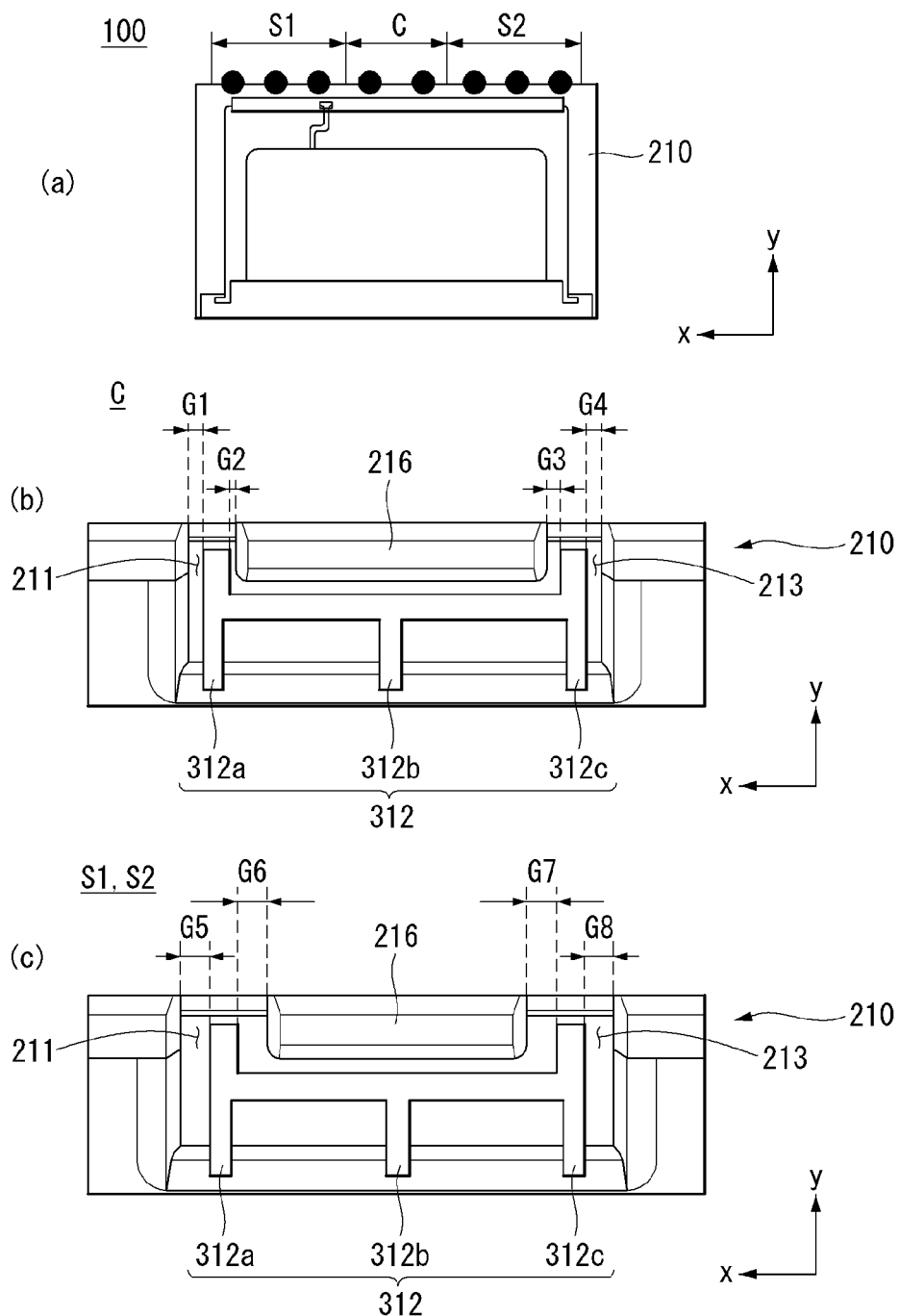

FIG. 18 is a view showing a state of arrangement of the first guide latch 210. The first guide latches 210 may be of different shapes depending on their positions.

Referring to FIG. 18 (a), the first guide latch 210 may be positioned on the upper edge of the display device 100. A plurality of first guide latches 210 may be spaced apart from each other.

The first guide latch 210 may be disposed at the central region C and the first and second outer regions S1 and S2. The central region C may be the central portion of the long edge of the display device 100. The first and second outer regions S1 and S2 may be the left and right outer regions of the central region C. The guide latch assembly 210 positioned in the central region C may be referred to as a central guide latch assembly 210. The guide latch assemblies 210 positioned in the outer regions S1 and S2 may be referred to as an outer guide latch assembly 210. The outer regions S1 and S2 may be referred to as ends regions.

Referring to FIG. 18 (b), the first guide latch 210 and the second coupling rib 312 disposed in the central region C can maintain the first to fourth gap G1 to G4 between them.

Referring to FIG. 18 (c), the first guide latch 210 and the second coupling rib 312 disposed in the first and second outer regions S1 and S2 can maintain the fifth to eighth gap G5 to G8 between them.

The first to fourth gaps G1 to G4 may be smaller than the fifth to eighth intervals G5 to G8. The width of the first and second coupling regions 211 and 213 of the first guide latch 210 disposed in the central region C may be equal to or smaller than the width of the first and second coupling regions 211 and 213 of the first guide latch 210 disposed in the outer regions S1 and S2. The difference of the width of the coupling regions 211 and 213 of the first guide latch 210 dependent on the location may be a configuration considering thermal expansion due to the operation of the display device 100.

In case that the back cover 150 expands due to the heat generated by the operation of the display device 100, the change in size due to the expansion at the first and second outer regions S1 and S2 can be greater than the change in size due to the expansion at the central region C. When the first guide latch 210 disposed in the central region C and the first guide latch 210 disposed in the first and second outer regions S1 and S2 are different from each other, the influence from the deformation of the back cover 150 can be minimized.

Figure 19:
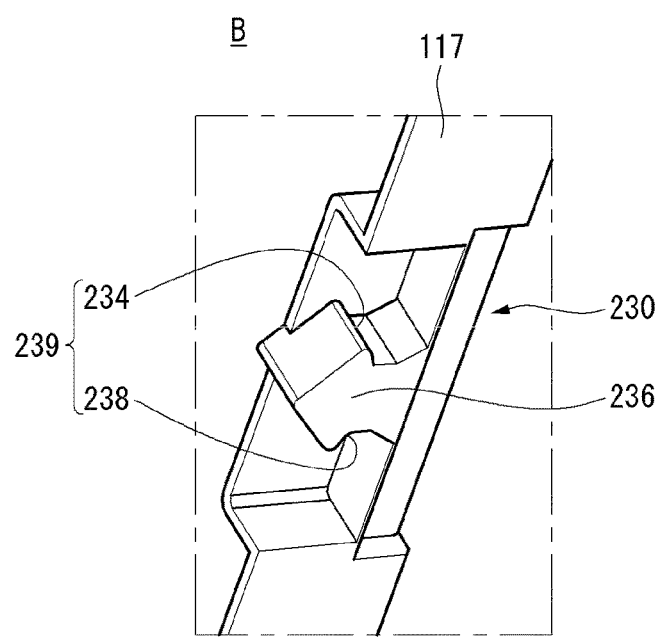

FIG. 19 is a view showing the first guide latch 230 of the guide panel 117.

Referring to FIG. 19, the second guide latch 230 may include a coupling protrude 236.

The coupling protrude 236 may be formed integrally with the guide panel 117, or may be molded separately and coupled to the guide panel 117. The coupling protrude 236 may protrude from the guide panel 117 toward the back cover 150. The coupling protrude 236 may include a first coupling groove 239.

The first coupling groove 239 may be formed on the body of the coupling protrude 236. For example, the shape of the cross-section of at least one region of the coupling protrude 236 may be different from the shape of the cross-section of the other region of the coupling protrude 236. The first coupling groove 239 may include first-a and first-b coupling grooves 234 and 238.

Figure 20:
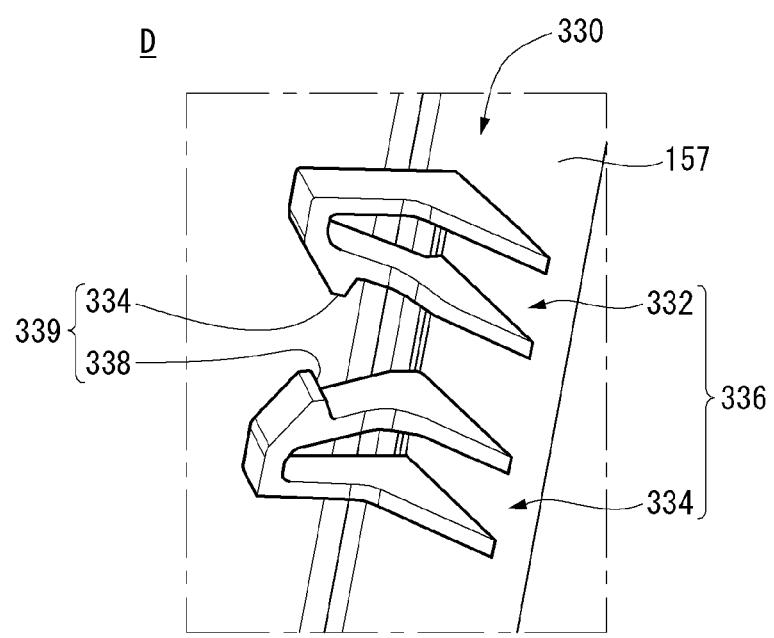

FIG. 20 is a view showing the second back cover latch 330 of the back cover 150.

Referring to FIG. 20, the second back cover latch 330 can protrude from the back cover 150. The second back cover latch 330 may include second-a and second-b back cover latches 332, 334, of which are symmetrical.

The second-a back cover latch 332 may be symmetric to the second-b back cover latch 334.

A second coupling groove 339 may be formed at the second back cover latch 330. A second-a coupling groove 337 may be formed at the second-a back cover latch 332. A second-b coupling groove 338 may be formed at the second-b back cover latch 334.

The second coupling groove 339 may include the second-a and the second-b coupling grooves 337 and 338. The second-a coupling groove 337 may be corresponding to the first-a coupling groove 234 of the coupling protrude 236. The second-b coupling groove 338 may be corresponding to the first-b coupling groove 238 of the coupling protrude 236. Therefore, when the back cover 150 is coupled to the guide panel 117, the second-a and second-b coupling grooves 337 and 338 can be inserted and fixed in the first-a and first-b coupling grooves 234 and 238, respectively. When a certain amount of force is applied to the back cover 150, the engagement between the first-a and first-b coupling grooves 234 and 238 and the second-a and second-b coupling grooves 337 and 338 can be released.

Figure 21:
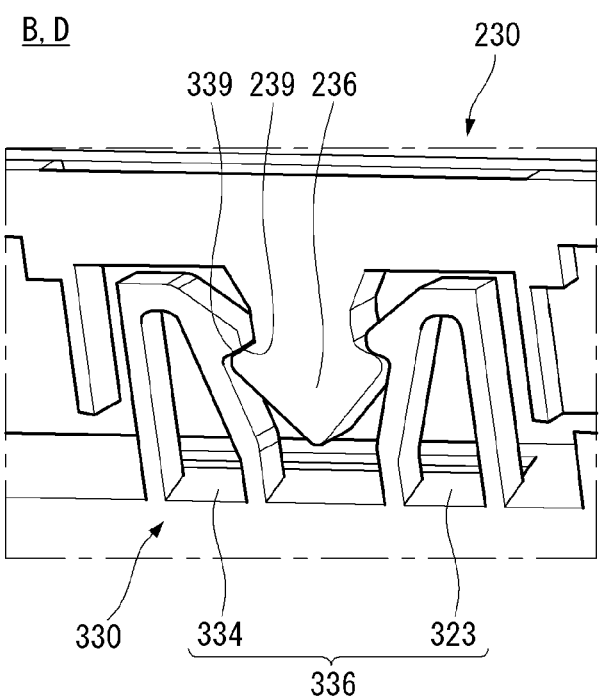

FIG. 21 is a view showing a state in which the second guide latch 230 and the second back cover latch 330 are engaged.

The second guide latch 230 can be inserted in and coupled to the second back cover latch 330 in the front-back direction. The second guide latch 230 can be inserted in and coupled to the second back cover latch 330 in the Z direction, for example.

Both second back cover latches 332 and 334 may be spaced apart from each other but may be symmetric to each other. The second coupling groove 339 of the second back cover latch 330 can be engaged with the first coupling groove 239 of the second guide latch 230.

The back cover 150 can be coupled to the rear portion of the display device 100 by the engagement of the first and second coupling grooves 239 and 339. The back cover 150 can be coupled without using a separate structure.

Figure 22:
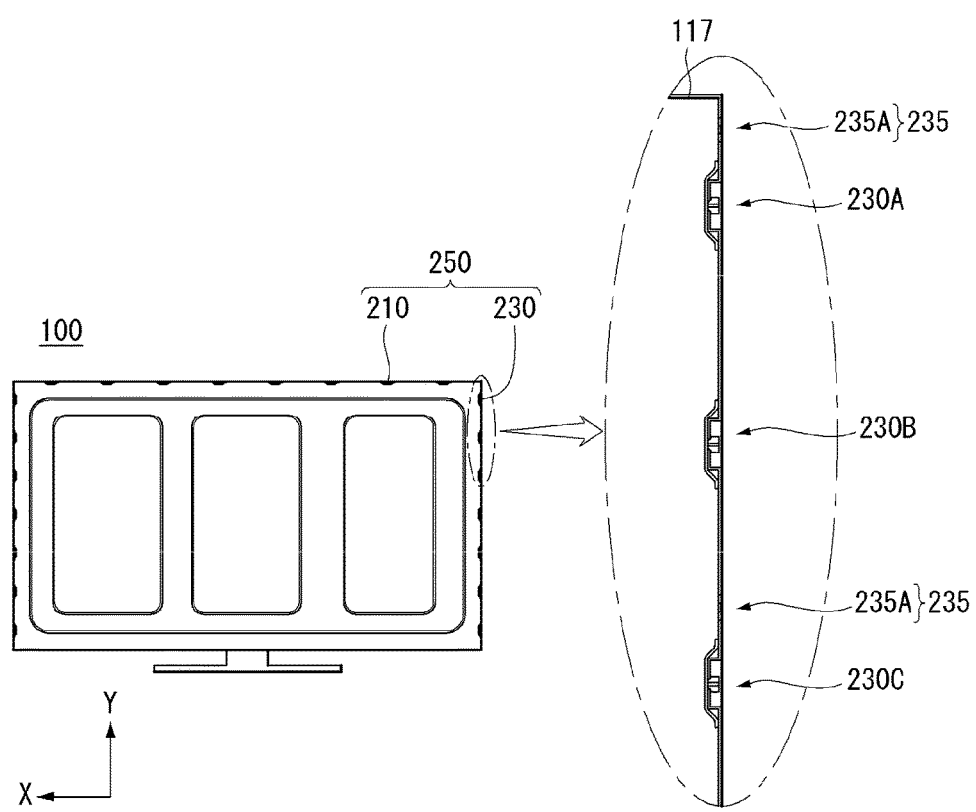
Figure 23:
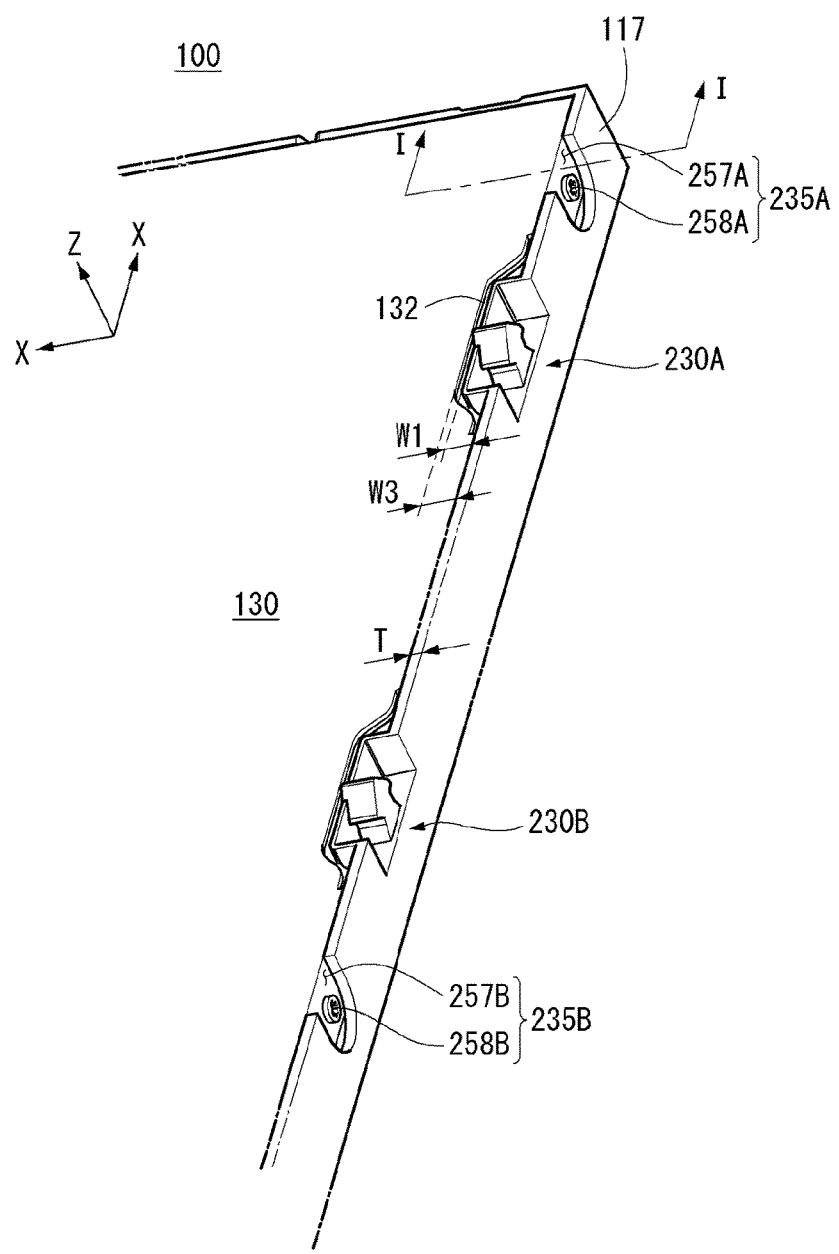
Figure 24:
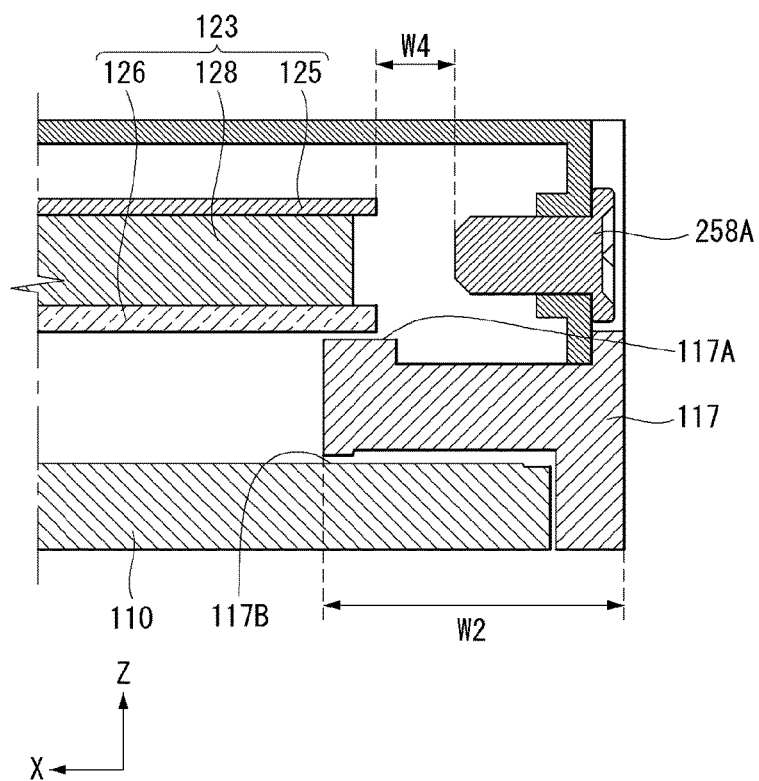

FIGS. 22 to 24 are views showing a portion of the guide latch assembly 250.

The guide latch assembly 250 can minimize the volume increase of the display device 100.

Referring to FIG. 22, the guide latch assembly 250 may be disposed at an edge area of the display device 100. For example, the second guide latch 230 may be disposed along the short side edge of the display device 100. For ease of understanding, the second guide latches 230 can be represented by a second-a guide latch 230A or second-b guide latch 230B or second-c guide latch 230C in the order in which they are arranged. A coupling assembly 235 may be positioned between the second guide latches 230.

The coupling assembly 235 may be located adjacent to the second guide latches 230. For example, the second-a and second-b guide latches 230A and 230B may be positioned between the first coupling assembly 235A and the second coupling assembly 235B.

Referring to FIG. 23, the guide panel 117 of thickness t may be located outside the other configuration. For example, the guide panel 117 may be located outside the frame 130.

The guide panel 117 may include a guide latch 230. For example, the second-a and the second-b guide latches 230A and 230B may be formed along the short edge of the guide panel 177. The guide latches 230 may be positioned between the coupling assemblies 235A and 235B.

The coupling assemblies 235A and 235B may include blank portions 257A and 257B and coupling members 258A and 258B.

The blank portions 257A and 257B may be formed by being recessed from the outer surface of the guide panel 117.

The coupling members 258A and 258B can be positioned in the blank portions 257A and 257B. The coupling members 258A and 258B may be coupled to the frame 130 or the like.

The frame 130 may be provided with a space for the second-a and the second-b guide latches 230A and 230B. The frame 130 may have the recessed portions 132 retracted inward to be corresponding to the shapes of the second-a and the second-b guide latches 230A and 230B. For example, the second-a and second-b guide latches 230A and 230B may protrude as much as a first width W1 toward an inside of the frame 130.

The recessed portion 132 can be retracted to the inside of the frame 130 as much as a third width W3. The third width W3 may be equal to or greater than the first width W1. The second-a and second-b guide latches 230A and 230B may be inserted into the recess portions 132.

The recessed portion 132 can prevent the overall size of the display device 100 from increasing even though the second-a and the second-b guide latches 230A and 230B are provided. In case that the second-a and the second-b guide latches 230A and 230B protrude outward due to the absence of the recessed portion 132, the overall size of the display device 100 may be relatively large.

FIG. 24 is a sectional view of the first coupling assembly 235A taken along the line I-I in FIG. 23.

The coupling member 258A of the first coupling assembly 235A may be inserted into the inside of the display device 100.

The coupling member 258A may be a screw. The coupling member 258A may be spaced apart from the optical layer 123 as much as a fourth width W4. The fourth width W4 may be a distance in consideration of thermal expansion of the optical layer 123. When the optical layer 123 expands due to the operation of the display device 100, the expanded optical layer 123 may be spaced apart as much as the fourth width W4 so as not to come into contact with the coupling member 258A.

The first guide panel 117 may extend toward the inside of the display device 100 while avoiding the coupling member 258A. The first guide panel 117 may extend toward the inside of the display device 100 as much as a third width W3. The first guide panel 117 avoids the coupling member 258A and extends toward the inside of the display device 100 so that the overall size of the display device 100 can be reduced, in spite of the presence of the second-a and second-b guide latches 230A and 230B. The first guide panel 117 may include first and second seating portions 117A and 117B.

The first and second seating portions 117A and 117B may be formed at an end region of the first guide panel 117 extending to the inside of the display device 100 by a second width W2. The first seating portion 117A can face the optical layer 123. The first seating portion 117A can support the optical layer 123. The second seating portion 117B can face the display panel 110. The second seat portion 117B can support the display panel 110.

The first seating portion 117A can guide the optical layer 123. For example, the optical layer 123 can be guided by the first seating portion 117A to be positioned at a specific position.

The second seat portion 117B can guide the display panel 110. For example, the display panel 110 may be contacted and/or attached to the second seating portion 117B.

Figure 25:
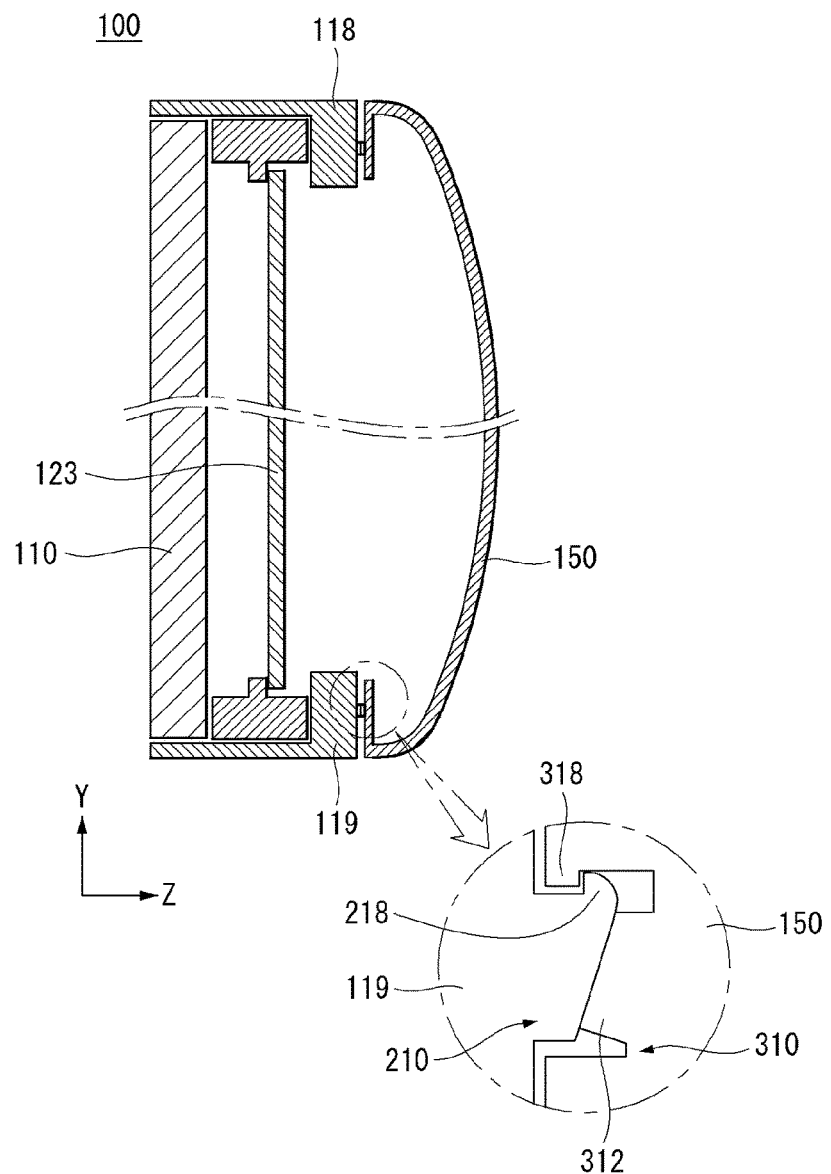
FIGS. 25 and 26 are views showing a coupling structure of a display device according to another embodiment of the present invention.
Figure 26:
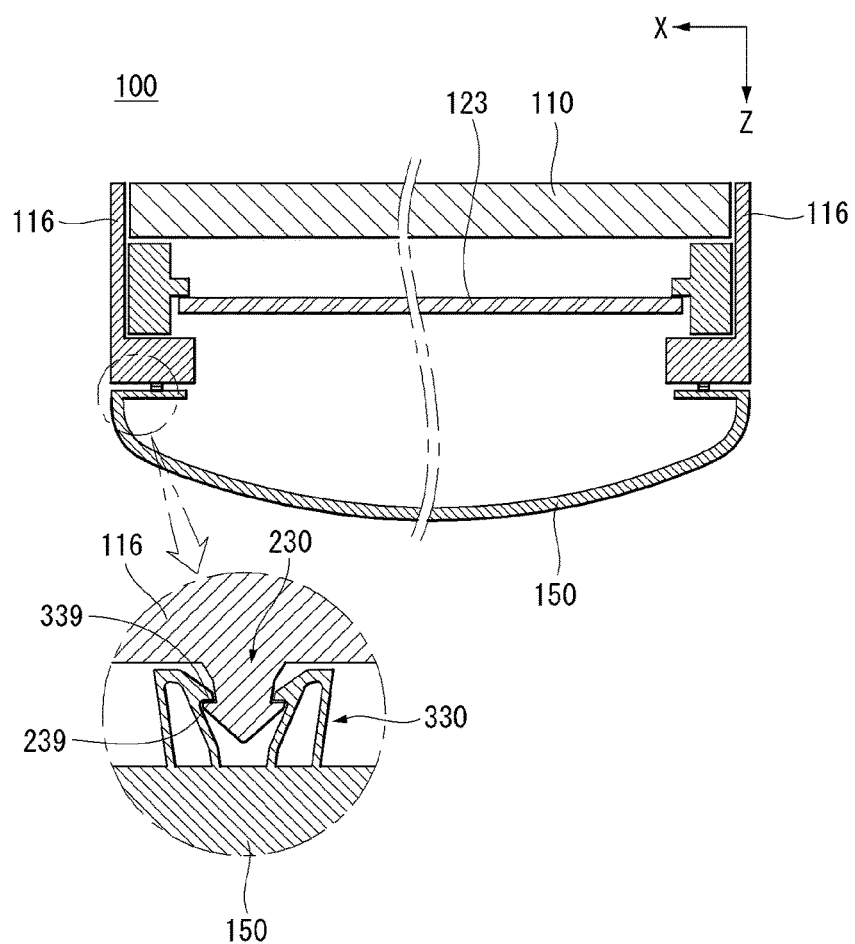

FIGS. 25 and 26 are views showing a coupling structure of a display device according to another embodiment of the present invention.

In the display device 100 according to another embodiment of the present invention, the structure for coupling the back cover 150 may be provided at a position different from the above-described actual example.

Referring to FIG. 25, the display device 100 may include a bottom cover 119 positioned on the lower end side of the display device 100. The bottom cover 119 may be a structure located outside the lower end of the display device 100. The bottom cover 119 can shield other structures inside.

The display device 100 may include a top cover 118 at the upper portion of the display device 100. The top cover 118 may be a structure for shielding the upper end side of the display device 100. In some cases, either the bottom cover 119 or the top cover 118 may be coupled to the outer portion of the display device 100 in the form of a picture frame.

A first guide latch 210 may be formed on the bottom cover 119 of the display device 100. For example, the first guide latch 210 may be integrally formed with the bottom cover 119. Alternatively, the first guide latch 210 may be coupled to the bottom cover 119.

The first back cover latch 310 corresponding to the first guide latch 210 may be formed on the back cover 150 of the display device 100. When the first back cover latch 310 is inserted into the first guide latch 210, the back cover 150 can be coupled to the bottom cover 119.

The first guide latch 210 may be formed at the top cover 118. In case that the first guide latch 210 is formed on the upper side and/or the lower side of the display device 100, the back cover 150 can be stably coupled to the first guide latch 210.

Referring to FIG. 26, the middle cover 116 may be located at the left side and right side of the display device 100.

The middle cover 116 may shield the components inside the display device 100. The middle cover 116 may be replaced with a bottom cover 119 and/or a top cover 118, or the middle cover 116 may serve as a bottom cover 119 and/or a top cover 118.

The first guide latch 230 may be located at the middle cover 116. The first guide latch 230 may be formed integrally with the middle cover 116. The first guide latch 230 may be coupled to the middle cover 116.

The second back cover latch 330 may be located on the back cover 150. The second back cover latch 330 may be positioned corresponding to the first guide latch 230. When the first guide latch 230 is engaged with the second back cover latch 330, the back cover 150 can be coupled to the middle cover 116.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
a display panel;
an optical sheet positioned at a rear of the display panel;
a guide panel positioned at a lateral side of at least one of the display panel and the optical sheet; and
a back cover positioned at a rear of the guide panel,
wherein the guide panel includes a guide latch assembly facing the back cover,
wherein the back cover includes a back cover latch assembly coupled to the guide latch assembly to couple the back cover to the guide panel,
wherein the guide latch assembly includes a first shielding rib and a second shielding rib spaced apart from the first shielding rib, and wherein the first shielding rib includes:
a first sidewall shielding rib protruding toward the display panel;
a second sidewall shielding rib protruding toward the display panel, the second sidewall shielding rib spaced apart from the first sidewall shielding rib; and
a roof shielding rib connecting the first and second sidewall shielding ribs.

2. The display device of claim 1,
wherein the back cover latch assembly includes a coupling rib coupled to the first and second shielding ribs.

3. The display device of claim 2, wherein the first shielding rib and the second shielding rib form a coupling space, and
wherein the coupling rib is accommodated in the coupling space.

4. The display device of claim 1, wherein the second shielding rib of the guide latch assembly is positioned between the first and second sidewall shielding ribs.

5. The display device of claim 4, wherein the second shielding rib includes a hooking protrusion at an end portion of the second shielding rib, and
wherein the hooking protrusion protrudes away from the roof shielding rib.

6. The display device of claim 5, wherein the coupling rib includes:
a central rib accommodated between the first and second sidewall shielding ribs, sand accommodated between the roof shielding rib and the second shielding rib;
a first coupling rib extended from the central rib and accommodated between the first sidewall shielding rib and the second shielding rib; and
a third coupling rib extended from the central rib and accommodated between the second sidewall shielding rib and the second shielding rib.

7. The display device of claim 6, wherein the coupling rib includes a second coupling rib extended from the central rib and accommodated between the roof shielding rib and the second shielding rib.

8. The display device of claim 7, wherein the coupling rib includes a fourth coupling rib spaced apart from the first, second, and third coupling ribs, and
wherein the fourth coupling rib is coupled to the hooking protrusion of the seconds shielding rib.

9. The display device of claim 8, wherein the central rib is positioned between the second coupling rib and the fourth coupling rib.

10. The display device of claim 9, wherein the guide latch assembly includes a plurality of guide latch assemblies disposed along an edge of the guide panel, and
wherein the back cover latch assembly includes a plurality of back cover latch assemblies positioned corresponding to the plurality of guide latch assemblies.

11. The display device of claim 10, wherein the plurality of guide latch assemblies are disposed along an upper edge of the guide panel.

12. The display device of claim 11, wherein the plurality of guide latch assemblies include:
a central guide latch assembly positioned in a central region of the upper edge of the guide panel; and
an outer guide latch assembly positioned in end regions of the upper edge of the guide panel.

13. The display device of claim 12, wherein a coupling space of the central guide latch assembly is smaller than a coupling space of the outer guide latch assembly.

14. The display device of claim 12, wherein a gap formed between the central guide latch assembly and the coupling rib is smaller than a gap formed between the outer guide latch assembly and the coupling rib.

15. The display device of claim 1, further comprising:
a frame positioned at a rear of the optical sheet,
wherein the frame is accommodated in the guide panel and forms a recessed portion receiving the guide latch assembly.

16. The display device of claim 1, wherein the guide latch assembly includes:
a first guide latch positioned on a horizontal edge of the guide panel; and
a second guide latch positioned on a vertical edge of the guide panel, and
wherein the back cover latch assembly includes:
a first back cover latch positioned on the back cover and coupled to the first guide latch; and
a second back cover latch positioned on the back cover and coupled to the second guide latch.

17. The display device of claim 16, wherein the second guide latch protrudes toward the back cover,
wherein the second back cover latch includes a second-a back cover latch protruding toward the guide panel and a second-b back cover latch protruding toward the guide panel, and
wherein the second guide latch is fitted into between the second-a back cover latch and the second-b back cover latch.

18. The display device of claim 17, wherein the second guide latch includes a first coupling groove,
wherein the second back cover latch includes a second coupling groove, and
wherein the second coupling groove is coupled to the first coupling groove.

19. The display device of claim 18, wherein the guide panel includes a blank portion recessed on an outer surface of the guide panel and a coupling member positioned in the blank portion.

* * * * *